(12) United States Patent
De Masi et al.

(10) Patent No.: US 11,451,089 B2
(45) Date of Patent: Sep. 20, 2022

(54) CHARGER ANTENNA UNIT, CHARGER DEVICE, AND DEVICE TO BE CHARGED

(71) Applicant: Oticon A/S, Smørum (DK)

(72) Inventors: Alessandro De Masi, Smørum (DK); Lars Pinnerup Frederiksen, Smørum (DK); Jens Troelsen, Smørum (DK); Lars Riemer, Smørum (DK)

(73) Assignee: Oticon A/S, Smørum (DK)

( * ) Notice: Subject to any disclaimer, the term of this patent is extended or adjusted under 35 U.S.C. 154(b) by 583 days.

(21) Appl. No.: 16/408,048

(22) Filed: May 9, 2019

(65) Prior Publication Data

US 2019/0348863 A1 Nov. 14, 2019

(30) Foreign Application Priority Data

May 9, 2018 (EP) .................................... 18171467

(51) Int. Cl.
*H02J 7/00* (2006.01)
*H02J 50/10* (2016.01)
(Continued)

(52) U.S. Cl.
CPC .......... *H02J 50/10* (2016.02); *H01F 27/2828* (2013.01); *H01F 27/363* (2020.08);
(Continued)

(58) Field of Classification Search
CPC .. H02J 50/12; H02J 50/90; H02J 50/70; H02J 50/80; H02J 50/50; H02J 7/025; H02J 50/60; H02J 50/40; H02J 7/35; H02J 5/005; H02J 7/00034; H02J 7/00304; H02J 7/0047; H02J 50/005; H02J 7/00; H02J 50/402; H02J 50/20; H02J 2310/40; H02J 7/00045; H02J 7/007182; H02J 7/04; H02J 7/045; H02J 2300/28; H02J 7/0042; H02J 7/34; H02J 50/05; H02J 50/10;
(Continued)

(56) References Cited

U.S. PATENT DOCUMENTS

| | | | | |
|---|---|---|---|---|
| 2015/0162753 A1* | 6/2015 | Werner | ................... | H02J 50/80 307/104 |
| 2015/0170833 A1* | 6/2015 | Widmer | .................. | H02J 50/80 307/104 |
| 2016/0238731 A1* | 8/2016 | Chopra | ................... | H02J 50/10 |

FOREIGN PATENT DOCUMENTS

| | | |
|---|---|---|
| CN | 107331498 A | 11/2017 |
| EP | 2 216 793 A2 | 8/2010 |

(Continued)

OTHER PUBLICATIONS

Extended European Search Report dated Oct. 25, 2019, for corresponding European Patent Application No. 19173585.1.

*Primary Examiner* — Binh C Tat
(74) *Attorney, Agent, or Firm* — Birch, Stewart, Kolasch & Birch, LLP

(57) ABSTRACT

A charger for charging a device to be inductively charged is described, comprising an excitation coil made of an electrical conductor wound around a toroidal core to excite a magnetic field inside the toroidal core, the toroidal core having an air-gap between two end-faces of the toroidal core, wherein the two end-faces are facing each other, and the winding density of the excitation coil along the toroidal length of the toroidal core is higher in the vicinity of the respective end-faces as compared to the remaining parts of the toroidal core.

16 Claims, 14 Drawing Sheets

(51) Int. Cl.
*H01F 27/28* (2006.01)
*H01Q 1/24* (2006.01)
*H02J 7/02* (2016.01)
*H01F 27/36* (2006.01)

(52) U.S. Cl.
CPC ............. *H01F 27/366* (2020.08); *H01Q 1/24* (2013.01); *H02J 7/025* (2013.01)

(58) Field of Classification Search
CPC .... H02J 7/00309; H02J 50/502; H02J 7/0029; H02J 2310/48; H02J 50/30; H02J 7/0044; H02J 50/15; H02J 7/0048; H02J 7/00714; H02J 2300/26; H02J 3/322; H02J 3/381; H02J 3/385; H02J 3/46; H02J 7/00302; H02J 7/0027; H02J 2207/40; H02J 2300/24; H02J 3/32; H02J 3/383; H02J 50/23; H02J 7/342; H02J 7/345; H03H 7/40; H03H 2001/0057; H04L 9/3278
USPC .................................................. 320/106–115
See application file for complete search history.

(56) References Cited

FOREIGN PATENT DOCUMENTS

| | | |
|---|---|---|
| EP | 2 824 680 A1 | 1/2015 |
| JP | 62-12109 A | 1/1987 |
| WO | WO 2009/100981 A1 | 8/2009 |

\* cited by examiner

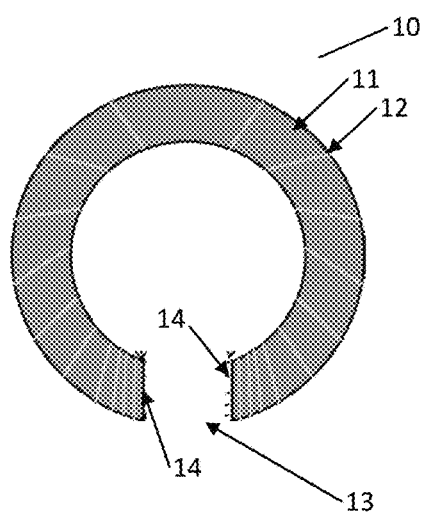
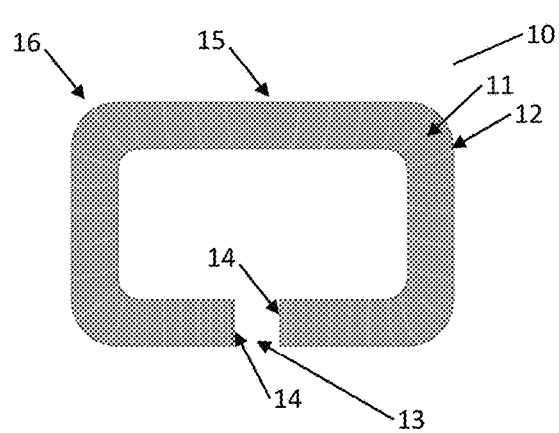
Fig. 1A
Fig. 1B
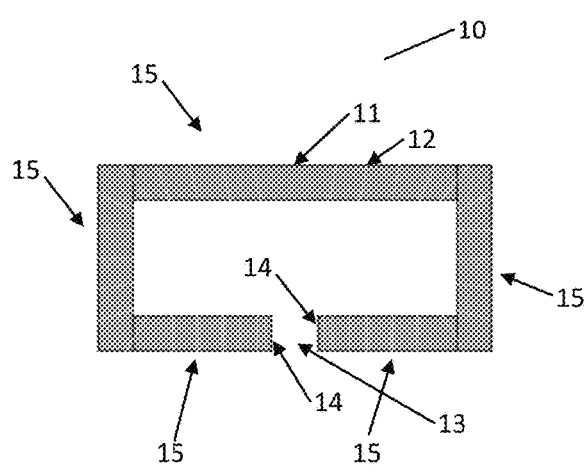
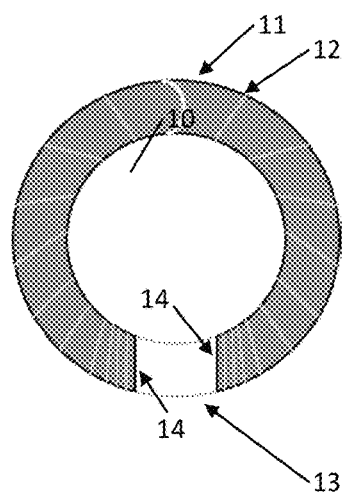
Fig. 1C
Fig. 1D

CHARGER ANTENNA UNIT, CHARGER DEVICE, AND DEVICE TO BE CHARGED

FIELD

The present disclosure relates to a charger antenna unit, a charger device, and a device to be inductively charged. More particularly, the disclosure relates to mobile devices having a rechargeable battery, which can be charged using an external charging device.

BACKGROUND

Recently, mobile electrical devices such as handheld devices are becoming more and more popular. Due to being mobile, these devices typically feature a battery for supplying electrical power for operation of the mobile device. In many cases, a rechargeable battery is used as the battery for convenience of the user.

However, a rechargeable battery needs to be recharged from time to time depending on usage, power consumption, and battery capacity.

Yet, getting the energy into the mobile device to charge the battery in the mobile device is challenging. A wired connection is cumbersome and fragile, and requires exposed connectors on the mobile device. Furthermore, connecting the mobile device to the charger needs precise placement and positive pressure on the connectors, which can lead to premature failure of the mobile device.

For wireless charging of the rechargeable battery, different options are available, one of which being inductive charging. For this, the mobile device is placed in a charging area of a charger device, which generates an alternating magnetic field extending into the charging area, e.g. by the use of one or more excitation coils. When the magnetic field enters through a receiver coil included in the mobile device, a current can be induced in the receiver coil, which can subsequently be converted to a charging current for recharging the battery. To describe the efficiency of the energy transfer, a coupling factor k can be defined.

Further, there is a trend in the design of mobile devices to reduce the size of the mobile devices, to make them more compact and hence, more attractive. However, a smaller design of the mobile devices requires the use of smaller coils, which tends to reduce an efficiency of the charging procedure, hence increasing a charging time needed to recharge the rechargeable battery to a full state, which also conflicts with the trend to make the mobile devices more attractive.

Even more, when reducing the size of the mobile device, the battery and other electrical components may be placed in a strong magnetic field while charging the mobile device in the charging area of the charger device. Such strong magnetic fields may result in heating of internal components in the mobile device, which again may decrease an efficiency of the mobile device due to increased resistances, degradation of the battery, and the like.

Further, in view of regulatory requirements for electromagnetic emissions (electromagnetic compatibility, "EMC"), it is also a goal to reduce the electromagnetic emissions of electrical devices. Since the charging time reduces with receiving more energy in the receiver coil of the mobile device, and while an increase of the received energy can be achieved with e.g. stronger magnetic fields generated by the excitation coils, an increase of the magnetic field strength will conflict with the reduction of electromagnetic emissions, hence, EMC requirements.

In view of the above, there is a need to provide a solution that addresses at least some of the above-mentioned problems. The present disclosure provides at least an alternative to the prior art.

SUMMARY

According to an aspect of the invention, a charger antenna unit for charging a device to be inductively charged comprises an excitation coil made of an electrical conductor wound around a toroidal core to excite a magnetic field inside the toroidal core, the toroidal core having an air-gap between two end-faces of the toroidal core, wherein the two end-faces are facing each other, and the winding density of the excitation coil along the toroidal length of the toroidal core is higher in the vicinity of the respective end-faces as compared to the remaining parts of the toroidal core.

The use of a toroidal core arrangement allows for enclosing a higher magnetic field density in the air-gap of the toroidal core, while leading to a more uniform magnetic field in the air-gap of the core. If the magnetic field density can be increased, a charging efficiency can be increased, which in turn allows to reduce the size of the toroidal core arrangement, or leads to reduced charging times of a rechargeable battery included in the device to be inductively charged. Due to the winding density of the excitation coil along the toroidal length of the toroidal core being higher in the vicinity of the respective end-faces as compared to the remaining parts of the toroidal core, a higher magnetic field density can be achieved between the two respective end-faces, thus contributing to the before-mentioned effects of the invention. Furthermore, an almost negligible leakage of the magnetic field around the core can be achieved, thus facilitating to meet EMC requirements.

The end-faces may be parallel to each other.

This allows for a more homogeneous magnetic field shape in the air-gap of the toroidal core. Hence, this allows for a more homogeneous magnetic field density and thus allows for a more efficient use of the magnetic field for charging the device to be inductively charged.

The toroidal core may be composed of one or more core parts, adjoining each other.

This allows for a more efficient and more flexible manufacture of the toroidal core, and allows for a more flexible shape of the toroidal core. Hence, this allows for the mobile device to be more compact and hence to achieve a higher charging efficiency. Even more, by having the one or more core parts adjoining each other, the magnetic fields can be guided more efficiently in the toroidal core, since additional air-gaps between the one or more core parts except for the air-gap between the two end-faces of the toroidal core can be avoided.

The one or more core parts may be arranged with respect to each other, so that the air-gap can be adjusted in terms of its gap width. The contact surfaces of two core parts adjoining each other of the one or more core parts may be formed to have matching shapes and preferably have a circular, cylinder, or spherical shape having matching radii.

An adjustable air-gap allows for providing a charger antenna, the air-gap of which can be adjusted for its size, which allows for efficient charging of the device to be inductively charged, and allows for an efficient charging process for different devices to be inductively charged having different shape and size. The matching shapes allow for a large contact area between the two core parts, while still allowing movement of the two core parts with respect to each other, preferably a swivel movement.

Having the toroidal core to be composed from one or more core parts allows for a more efficient and more flexible manufacture of the toroidal core, and allows for a more flexible shape of the toroidal core. Hence, this allows for the mobile device to be more compact and hence to achieve a higher charging efficiency. Even more, by having the one or more core parts adjoining each other, the magnetic fields can be guided more efficiently in the toroidal core, since additional air-gaps between the one or more core parts except for the air-gap between the two end-faces of the toroidal core can be avoided.

The air-gap of the toroidal core may be formed such that a receiving antenna of the device to be inductively charged can at least partially be inserted therein.

This allows for a better coupling between the magnetic field excited by the toroidal core and the receiver coil of the device to be inductively charged, and for the allows for a more efficient charging of the device to be inductively charged.

According to another aspect of the invention, a charger unit may be provided, which comprises a charger antenna unit according any one of the above-mentioned aspects, and a housing having an opening adapted to be aligned with the device to be inductively charged, such that a receiving antenna of the device to be inductively charged can at least partially be inserted into the air-gap of the toroidal core of the charger antenna unit.

This allows a charger antenna unit to be included in a charging unit wherein the charger antenna unit provides the effects mentioned above. In the housing has an opening adapted to be aligned with the device to be inductively charged, this allows to insert the device to be inductively charged at least partially into the air-gap of the toroidal core of the charger antenna unit.

Into the air-gap of the toroidal core an insert may be arranged in order to position the device to be inductively charged, e.g. a hearing aid device, such that an inductive field of a telecoil of the device is aligned to the inductive field of the charger antenna. When they are aligned then the coupling efficiency is optimal. Additionally, the insert and the device to be inductively charged may comprise a magnet of a ferromagnetic material or a metal part comprising a material of an opposite pole in view of the magnet. The attraction force between the magnet and the metal part aligns the inductive field of the telecoil to the inductive field of the charger antenna.

The insert may comprise a temperature detection mean configured to measure a temperature around the rechargeable battery, and a processor unit of the charger unit is then configured to estimate the battery temperature by table values including the temperature difference between previously measured battery temperature and previously measured temperature around the rechargeable battery.

At least a part of the housing, or a part formed inside the housing, may be provided with a magnetic shield.

This allows for a better guidance of the magnetic field in the toroidal core, hence, increasing efficiency of the charging process, while this additionally allows for a reduction of the magnetic field outside of the housing other than in the air-gap of the toroidal core. Hence, the emission of the magnetic field other than the emission of the magnetic field into the air-gap of the toroidal core can be reduced and thus, regulatory requirements for electrical devices can be achieved in an easier way, while the efficiency of the charger unit can be further improved. Such a shield could be achieved by positioning a shield plate at one side, such as at the top of or at the bottom of, of the toroidal core. A second shield plate could be positioned at the opposite side of the toroidal core, so that the toroidal core is sandwiched between the two shield plates. Further, one or both of such shield plates may include an opening. Such an opening could correspond, either fully or substantially or in part, to the central opening in the toroidal core. An inner shield may be provided or arranged in the central opening of the toroidal core. This may be in combination with one or two, or more, of the above-mentioned shield plate. The toroidal core could be encapsulated, e.g. in a box-like structure. The encapsulation unit could generally be a non-conductive, plastic material. The encapsulation unit, and/or the shield, may be made from a core of an ABS material, such as ABS Resin, and coated with a metallic material. The coating may be composed of several layers. When using several layers, some or all layers may be of identical material or different material. An outer coating may be applied, such as a layer for passivating the device. The encapsulation unit may be made in an injection molding process, other molding process, or any other suitable process. The encapsulation unit may then be coated or plated, at the full or part or the surface, with an electrically conductive material. The coating or plating may be formed on one or more surfaces. The coating or plating may be formed by plating, such as electroplating, or other suitable process or processes. Advantageously, the encapsulation unit may be formed by two or more parts. Further, a slit or opening may be formed in the encapsulation unit. Such a slit may e.g. be achieved by positioning two parts so that there is an area or volume where there is no contact between the two parts. Two electrically separate parts may be may be established in the encapsulation unit, i.e. the shield or shield unit, as described generally herein, by positioning an insulating material at an interface between the two encapsulation or shield parts, which could be an area or part configured to abut the other part. A shield may be configured to reduce the magnetic field and/or the electrical field emitted at unwanted parts of the toroidal core. The shield may help confine or concentrate the magnetic field to the area where it is desired, e.g. in the gap or opening of the toroidal core.

Advantageously, at some parts of the toroidal core the windings may be more dens compared to other parts. This could may be achieved by a ratio of the windings, e.g. between 70 and 100 percent of the windings, being positioned closer to the opening of the toroidal core, i.e. in a relatively shorter distance than the remaining 30 or less percent of the windings. As an example, 75 percent of the winding may occupy a length of the toroidal core being less than 25% of the total length or circumference. Other ratios are possible. The windings may e.g. be placed on a length corresponding to 5 to 25 percent of the complete circumference of the toroidal core. The length were the windings are placed may occupy the two areas at opposite sides of an opening in the toroidal core, such two areas may together constitute then mentioned length. A major portion of the winding may be placed on a length corresponding to 5 to 25 percent of the complete circumference of the toroidal core, and a minor portion may be placed at the remaining part of the circumference of the toroidal core, excluding any opening in the toroidal core. The length may be measure including or excluding one or more openings. As mentioned elsewhere, the toroidal core may include an opening for receiving the device to be charged, or at least a part of the device to be charged, for instance the part of the device to be charged that include a receiving coil or antenna. A part of the toroidal core may be without windings, e.g. void of windings, or at least with only one or few windings. This could be achieved by arranging winding at the end parts of the toroidal core near the opening, and only a connecting wire along the rest of the circumference of the toroidal core.

The shielding may include a part extending into the center of the toroidal core. Such a part may be formed integral with a top part and/or a bottom part of a shield. The shield may be the magnetic shield.

The magnetic shielding may be made out of at least one material selected from copper, copper-alloy, aluminum, or a material having high electrical conductivity allowing the occurrence of eddy currents in the material, or the magnetic shielding may be made out of at least one material selected from mu-metal, permalloy, supermalloy, soft ferromagnetic alloy, or a material having a high magnetic permeability and low magnetic coercitivity.

A magnetic field leaking around the coil induces eddy currents in a magnetic shielding. A high electrical conductivity of the material for the magnetic shielding as e.g. in copper increases the strength of the eddy currents in the shielding. Thus, this leads to an improved shielding effect.

According to Faraday's and Lenz law, the induced eddy current in copper shielding opposes the leakage filed. Thereby, the field becomes more concentrated in the toroidal core and in the air-gap, which thus leads to an increase of the efficiency of the charging process.

A material having a high magnetic permeability allows for efficient magnetic shielding and hence, allows for a reduced unwanted stray emission of the magnetic field, that is, the magnetic field outside of the housing other than in the air-gap of the toroidal core, which in turn increases the efficiency of the charging process. A material having a low magnetic coerciivity reduces losses in the material induced by the alternating magnetic field, hence, this allows for an increased efficiency of the charging process. Hence, the coupling factor increases, correspondingly.

Further, these features allow for a better guidance of the magnetic field in the toroidal core, thus increasing the efficiency of the charging process (thus increasing the coupling coefficient k), while these features additionally allow for a reduction of the stray emission. Hence, the emission of the magnetic field other than the emission of the magnetic field into the air-gap of the toroidal core can be reduced, and thus, regulatory requirements for electrical devices can be achieved in an easier way, while the efficiency of the charger unit can be further improved.

The magnetic shielding may be composed of a first magnetic shielding part and a second magnetic shielding part, and the first magnetic shielding part and the second magnetic shielding part are separated from each other by slits having a toroidal shape in a plane parallel to the plane of the toroidal core of the charger antenna unit.

This allows for avoiding unwanted eddy currents in the magnetic shielding, which could block or reduce the magnetic field excited in the toroidal core, hence increasing the efficiency of the charging process.

The first magnetic shielding part and the second magnetic shielding part may be galvanically connected.

This allows avoiding voltage differences between the first and the second magnetic shielding part, and further allows increasing the efficiency of the charging process.

According to yet another aspect of the invention, a charger device may be provided, which comprises a charger unit according to any of the aspects described before, detection means, configured to detect the presence of the device to be inductively charged, receiving means, configured to receive information relating to a charge state of a rechargeable battery of the device to be inductively charged, driving means, configured to supply power to the charger antenna unit of the charger unit, control means, configured to control the driving means in response to received information received by the receiving means, wherein the control means is configured to control the driving means to supply power to the charger antenna unit only in case the detection means has detected the presence of the device to be inductively charged. Additionally, the detection means can be realized by a mechanical contact, a capacitive sensor, an inductive sensor, or similar means.

This allows providing a charger device comprising a charger unit according to any of the aspects described before. The detection means allows avoiding or interrupting and operation of the charger antenna unit in case no device to be inductively charged is present or in case the device is removed. The receiving means allows providing information about the charge state of the rechargeable battery of the device to be inductively charged to the control means. The driving means allows operating the charger antenna unit. The control means allows controlling the charging process based upon the charge state of the rechargeable battery of the device to be inductively charged and based on the information received by the detection means. Hence, the control means allows for an efficient charging process based on the charge state of the rechargeable battery in case the device to be inductively charged is present.

The charger device may be provided with transmission means, which is configured to transmit, i.e. to communicate, information to the device to be inductively charged, and wherein the receiving means is configured to receive information from the device to be inductively charged.

This allows to transmit information to the device to be inductively charged, such as a request for transmitting the charge state of the rechargeable battery to the charger unit, while this in addition allows to receive further information about the device to be inductively charged, e.g. a temperature inside the device to be inductively charged, a temperature of the rechargeable battery, and so on. In principle, this allows for the implementation of a set of commands, e.g. to request information from the device to be inductively charged or to transmit information to the device to be inductively charged.

The transmission means and the receiving means may be configured to transmit and to receive information using the charger antenna unit.

This allows for using the same charger antenna unit for charging the device to be inductively charged as well as to transmit and to receive information and from the device to be inductively charged. In turn, this avoids usage of additional transmitting and receiving means, which further allows for a reduction in size of the device to be inductively charged and the charger unit. Hence, the charging process can be made more efficient and energy consumption of the device to be inductively charged can be reduced.

The charger device may be provided with a shielding means to protect at least a part of the device to be inductively charged from electromagnetic energy emitted by the charger antenna unit.

This allows for the magnetic field density within the air-gap of the toroidal core to be adapted to the shape and the size of the device to be inductively charged, hence, the magnetic field can be confined in the air-gap where the receiver coil is placed. Hence, this allows increasing the efficiency of the charging process. Furthermore, this allows to avoid an unwanted entering of the magnetic field in the air-gap of the toroidal core into parts of the device to be inductively charged, and hence, allows to avoid damage to electric components that may be affected by strong magnetic fields.

According to yet another aspect of the invention, a device to be inductively charged may be provided, which comprises a rechargeable battery for storing power used to operate the device to be inductively charged, charge state detection means to detect the charge state of the rechargeable battery, a receiving antenna, configured to receive electromagnetic energy from a charger device for charging the rechargeable battery, receiving means, configured to receive information from a charger device, a transmission means, configured to transmit information to a charger device, and control means, configured to control the transmission means to transmit the charge state detected by the rechargeable battery charge state detection means to the charger device.

Additionally, a temperature detection means for detection of a temperature of the rechargeable battery or another component inside the device to be inductively charged may be provided in the device to be inductively charged.

The rechargeable battery allows for a mobile use of the device to be inductively charged. The charge state detection means allows to detect charge state of the rechargeable battery, but also to detect a charging speed when charging the rechargeable battery. The receiving antenna allows receiving electromagnetic energy from the charger device, while it also allows receiving information from the charger device by the receiving means, while it also allows transmitting information to the charger device by the transmission means. The temperature detection means allows determining a temperature inside the device to be inductively charged and allows the control means to control the charging process based upon the determined temperature.

The device to be inductively charged may be provided with a shielding unit, which is configured to shield the rechargeable battery from external electromagnetic fields.

This allows reducing heating of the rechargeable battery due to electrical losses induced by the alternating magnetic field in the rechargeable battery, which reduces a possibility of a damage to the rechargeable battery, reduces the wear of the rechargeable battery, and hence increases the efficiency of the charging process.

The shielding unit in the device to be inductively charged may be provided directly on the rechargeable battery.

This allows for a reduction in size of the shielding unit in the device to be inductively charged, and hence, allowed us to reduce the size of the device to be inductively charged, which in turn allows increasing the efficiency of the charging process.

The shielding unit may be at least partially provided on the shell of the device to be inductively charged.

This allows for an efficient manufacturing of the shielding unit in the device to be inductively charged, e.g. by attaching a metallic coating on the shell of the device to be inductively charged, which in turn allows to reduce a thickness of the metallic coating, which reduces the weight of the device to be inductively charged. Furthermore, this allows for a protection of other components within the device to be inductively charged against heating associated with electrical losses due to the alternating magnetic field.

The device to be inductively charged may further comprise an electro-acoustic transducer for emission of audible signals, wherein the electro-acoustic transducer is used as the receiving antenna of the device to be inductively charged.

The electro-acoustic transducer allows to emit audible signals to the outside of the device to be inductively charged, while in case a coil is used to excite the audible signals, this coil may be used as the receiving antenna of the device to be inductively charged. This allows sparing another receiving antenna unit, and hence, allows reducing the size of the device to be inductively charged.

The device to be inductively charged may further comprise an electro-acoustic transducer for emission of audible signals, wherein the receiving antenna of the device to the inductively charged is positioned in an air volume of the electro-acoustic transducer.

This allows for an even more compact design of the electroacoustic transducer and the receiving antenna of the device to be inductively charged. Hence, the size of the device to be inductively charged can be further reduce and thus, the efficiency of the charging process can be further increased.

The device to be inductively charged may further comprise a telecoil for detection of electromagnetic signals, wherein the telecoil is used as the receiving antenna of the device to be inductively charged.

In many mobile devices, a telecoil is used to receive information inductively transmitted to the device to be inductively charged. Hence, this allows using the telecoil as the receiving antenna and hence, allows for a further reduction in size of the device to be inductively charged.

The device to be inductively charged may further comprise a coil for high-frequency communication, wherein the coil is used as the receiving antenna of the device to be inductively charged.

In many mobile devices, a coil may be used to transmit and receive information to and from a coupled device, such as transmitting information between the two hearing instruments used for a left and right ear of a same person, transmitting information between a headset and a mobile phone, or the like. Hence, using the coil as the receiving antenna of the device to be inductively charged allows for a further reduction in size of the device to be inductively charged, and hence, allows increasing the efficiency of the charging process.

According to yet another aspect of the invention, a dual-charger device may be provided, which comprises a first and a second charger device, and further comprises a control device configured to control the operation of the first and second charger device, wherein the control device is configured to control the phase of a driving signal supplied to the charger antenna unit of the second charger device to be shifted by 180 degrees with respect to the driving signal supplied to the charger antenna unit of the first charger device.

This allows reducing conducted and radiated electromagnetic emissions of the dual charger device, and hence, allows complying with regulatory requirements in terms of the emission of electromagnetic stray fields. However a lower emission also reduces the consumed energy in the charging process, hence, this allows increasing the efficiency of the charging process.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

FIG. 1A illustrates a charging antenna unit having a toroidal core according to a first aspect of the invention;

FIG. 1B illustrates another charging antenna unit having another toroidal core according to a modification;

FIG. 1C illustrates yet another charging antenna unit having yet another toroidal core according to a modification;

FIG. 1D illustrates yet another charging antenna unit having yet another toroidal core according to a modification;

DETAILED DESCRIPTION

Figure 2A:
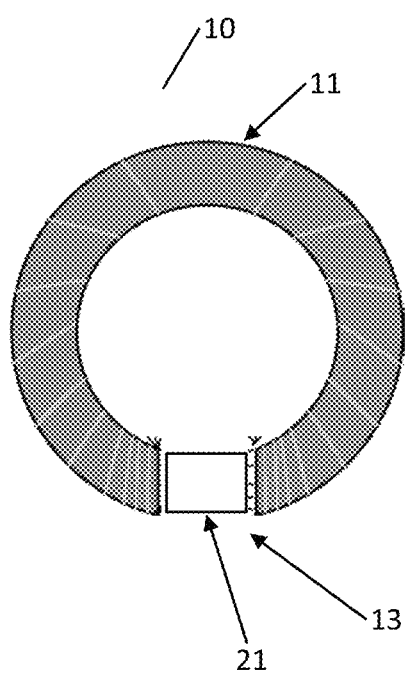
FIG. 2A illustrates a charging arrangement using a charging antenna unit according to the invention.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The device to be charged may be a hearing device which may include a hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. The "hearing device" may further refer to a device such as an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of middle ear of the user or electric signals transferred directly or indirectly to cochlear nerve and/or to auditory cortex of the user.

The hearing device is adapted to be worn in any known way. This may include i) arranging a unit of the hearing device behind the ear with a tube leading air-borne acoustic signals into the ear canal or with a receiver/loudspeaker arranged close to or in the ear canal such as in a Behind-the-Ear type hearing aid, and/or ii) arranging the hearing device entirely or partly in the pinna and/or in the ear canal of the user such as in a In-the-Ear type hearing aid or In-the-Canal/Completely-in-Canal type hearing aid, or iii) arranging a unit of the hearing device attached to a fixture implanted into the skull bone such as in Bone Anchored Hearing Aid or Cochlear Implant, or iv) arranging a unit of the hearing device as an entirely or partly implanted unit such as in Bone Anchored Hearing Aid or Cochlear Implant.

A "hearing system" refers to a system comprising one or two hearing devices, and a "binaural hearing system" refers to a system comprising two hearing devices where the devices are adapted to cooperatively provide audible signals to both of the user's ears. The hearing system or binaural hearing system may further include auxiliary device(s) that communicates with at least one hearing device, the auxiliary device affecting the operation of the hearing devices and/or benefitting from the functioning of the hearing devices. A wired or wireless communication link between the at least one hearing device and the auxiliary device is established that allows for exchanging information (e.g. control and status signals, possibly audio signals) between the at least one hearing device and the auxiliary device. Such auxiliary devices may include at least one of remote controls, remote microphones, audio gateway devices, mobile phones, public-address systems, car audio systems or music players or a combination thereof. The audio gateway is adapted to receive a multitude of audio signals such as from an entertainment device like a TV or a music player, a telephone apparatus like a mobile telephone or a computer, a PC. The audio gateway is further adapted to select and/or combine an appropriate one of the received audio signals (or combination of signals) for transmission to the at least one hearing device. The remote control is adapted to control functionality and operation of the at least one hearing devices. The function of the remote control may be implemented in a SmartPhone or other electronic device, the SmartPhone/electronic device possibly running an application that controls functionality of the at least one hearing device.

In general, a hearing device includes i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to enhance a target acoustic source among a multitude of acoustic sources in the user's environment. In one aspect, the directional system is adapted to detect (such as adaptively detect) from which direction a particular part of the microphone signal originates. This may be achieved by using conventionally known methods. The signal processing unit may include amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing devices, the output unit may include one or more output electrodes for providing the electric signals such as in a Cochlear Implant.

In the figures and in the description, same reference signs refer to same or similar components so that a description of same components in other embodiments is omitted.

FIG. 1A illustrates a charging antenna unit 10 having a toroidal core 11 according to a first aspect of the invention. FIG. 1A shows a charging antenna unit 10 having a toroidal core 11 and an excitation coil 12 wound around the toroidal core. The toroidal core 11 is characterized by having a toroidal shape. The excitation coil 12 is made by winding an insulated electrical conductor around the toroidal core 11. A magnetic field can be excited in the toroidal core 11 by driving an electrical current through the electrical conductor of the excitation coil 12 by connecting two electrical contacts (not shown) of the excitation coil 12 to a current source (not shown). By driving an alternating current, an alternating magnetic field can be excited in the toroidal core 11, which can be used to charge a device to be inductively charged, which is inserted into an air-gap 13 of the toroidal core 11.

The electrical conductor is made by a wire or metallic strip made from a highly conducting material, such as copper or a copper alloy in order to reduce the electrical resistance of the excitation coil 12. The electrical conductor is isolated to avoid short-circuiting of the conductor within the coil or to the toroidal core 11.

The toroidal core 11 is made from materials, which are suitable for guiding magnetic fields, such as laminated steel plates, non-conductive magnetic ceramics, ferrites, and so on.

A "toroidal shape" as used in this description describes a circular or substantially circular shape. The substantially circular shape may differ from a circular shape by having edges or corners, straight parts, as well as protruding parts, as long as the substantially circular shape encloses an enclosed area. The toroidal shape may be interrupted by an air-gap, as in an open ring shape, as long as the toroidal shape substantially encloses the enclosed area.

Due to the core being made from a suitable material, the magnetic field is guided in the toroidal core, while by the shape of the toroidal core it enters the air-gap of the toroidal core and is confined in the air-gap of the toroidal core. In this air-gap, a receiver coil can be placed, which is described later.

Hereby, a "toroidal length" is a length in a toroidal direction of the toroidal core, in contrast to a poloidal length, which describes a circumferential length of a cross-section of the toroidal core. The toroidal length may be measured along e.g. an outer circumference or an inner circumference, or it may be defined as a mean value of the outer and the inner circumferential length, may be defined as a length along the magnetic field, or the like.

Furthermore, the toroidal core 11 has an air-gap 13, which is a cut-out portion of the substantially circular shape of the toroidal core 11 ranging from one end-face 14 of the toroidal core 11 to the other end-face 14 of the toroidal core 11.

The toroidal core 11 may have a circular cross-section, a rectangular cross-section, or a cross-section having a more complex shape, as long as the toroidal core 11 is suitable for guiding a magnetic field inside, substantially vertically to the cross-section of the toroidal core. In addition, the cross-section of the toroidal core 11 may vary along the toroidal length of the toroidal core 11 in order to adapt the toroidal core 11 e.g. for manufacturing or mounting.

The excitation coil 12 extends along the toroidal core 11 from one end-face 4 of the toroidal core 11 to the other end-face 14 of the toroidal core 11. The excitation coil 12 may have the electrical conductor wound in one layer or in several layers around the toroidal core 11. The two electrical contacts of the excitation coil 12 may be arranged on either end of the excitation coil 12 or on opposing ends of the excitation coil 12 each, or at an arbitrary position along the coil.

In the following, a coil having only one winding layer is considered, wherein one electrical contact of the coil is arranged on one end of the coil, while the other electrical contact is arranged on the other end of the coil.

The excitation coil may be defined in terms of its coil length.

Hereby, a winding density WD of the excitation coil 12 is defined as the number N of windings of the excitation coil 12 in a certain part of the excitation coil 12 having a non-zero length (a toroidal length) L. In this case, the winding density is defined in Formula I:

$$WD = N/L \quad \text{(Formula I)}$$

Hereby, the winding density WD varies along the coil length of the excitation coil 12, that is, along the toroidal length of the toroidal core 11, so that the winding density is higher at either end of the excitation coil 12 as compared to intermediate parts of the excitation coil 12. So, when considering the winding density WD of the excitation coil 12 from one end to the other end of the coil, the winding density at one end of the coil is a first winding density value WD1, while the winding density in an intermediate part of the excitation coil 12 is a second winding density value WD2, and at the other end of the excitation coil 12 the winding density is the first winding density value WD1.

Preferably, the winding density of the excitation coil 12 along the toroidal length of the toroidal core 11 is symmetric with respect to a central part of the excitation coil 12. The winding density WD may vary abruptly or may vary gradually along the toroidal length of the toroidal core 11. In certain parts, the winding density WD may even be zero or close to zero. Hence, it can be said that the winding density WD of the excitation coil 12 along the toroidal length of the toroidal core 11 is higher in the vicinity of the respective end-faces 14 of the toroidal core 11 as compared to the remaining parts of the toroidal core 11.

The higher winding density WD in the vicinity of the end-faces 14 provides the advantage that the magnetic field density in the air-gap 13 for a charging antenna unit having a given winding number is increased as compared to an arrangement having a uniform winding density along the toroidal core 11.

With concentrating of the windings close to the edges, the magnetic field will become more concentrated in the area of the air-gap 13, and therefore the coupling factor k will increase. This fact leads to a better energy transfer and hence, a shorter charging time, and less temperature rise of the battery as mentioned above.

Figure 10:
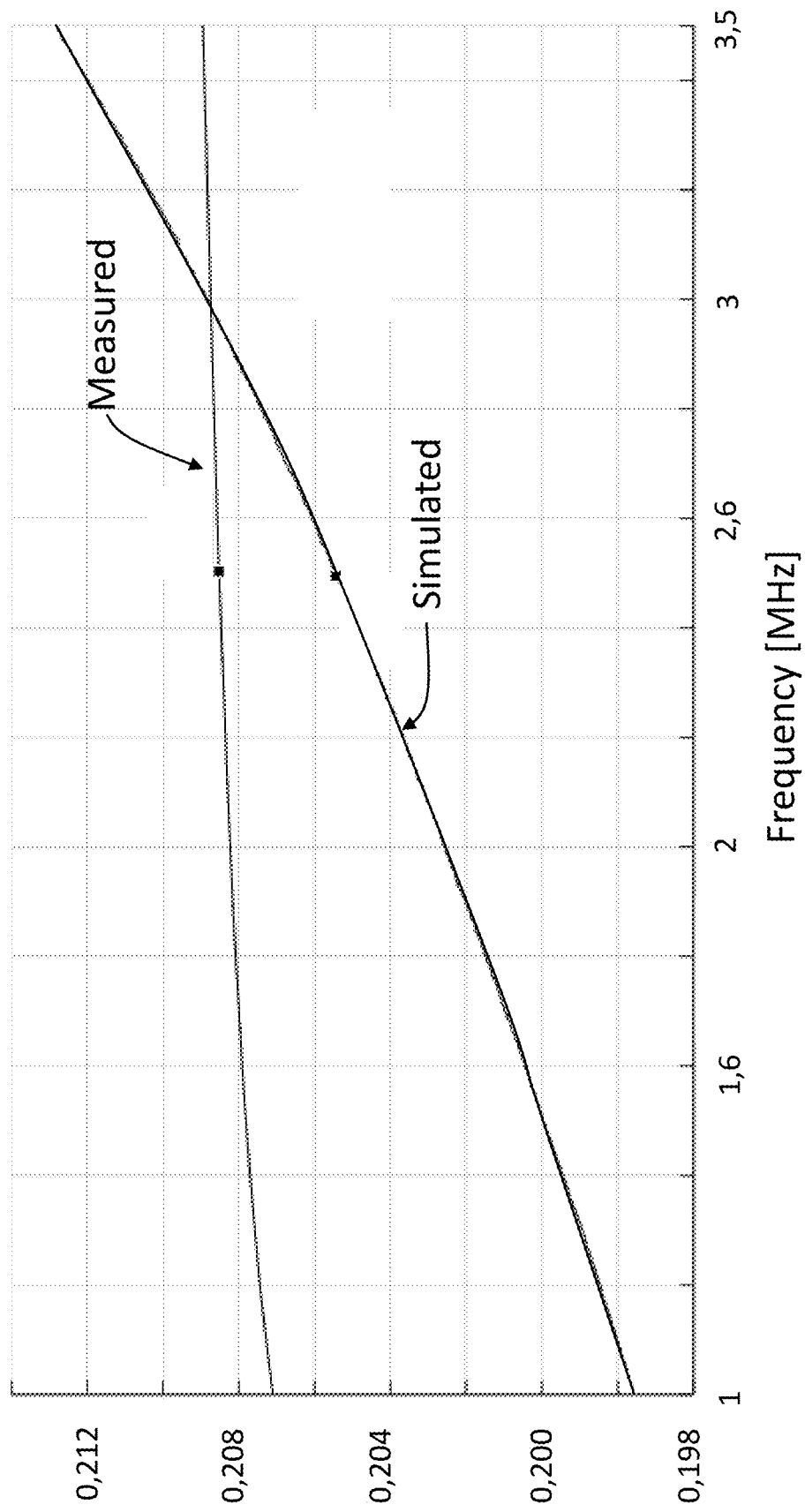
FIG. 10 depicts a graph showing a frequency dependence of the coupling factor in an example.

FIG. 10 discloses a measured and simulated coupling coefficient, k, as a function of the frequency of the alternating magnetic field, i.e. the resonance frequency of the charger antenna 10. For example, at 2.5 MHz the coupling coefficient is measured to be 0.21 and the simulated value is 0.205. The measured and simulated coupling coefficient is based on a certain toroidal core material. In this specific example, the rechargeable battery is a lithium ion battery.

Figure 11:
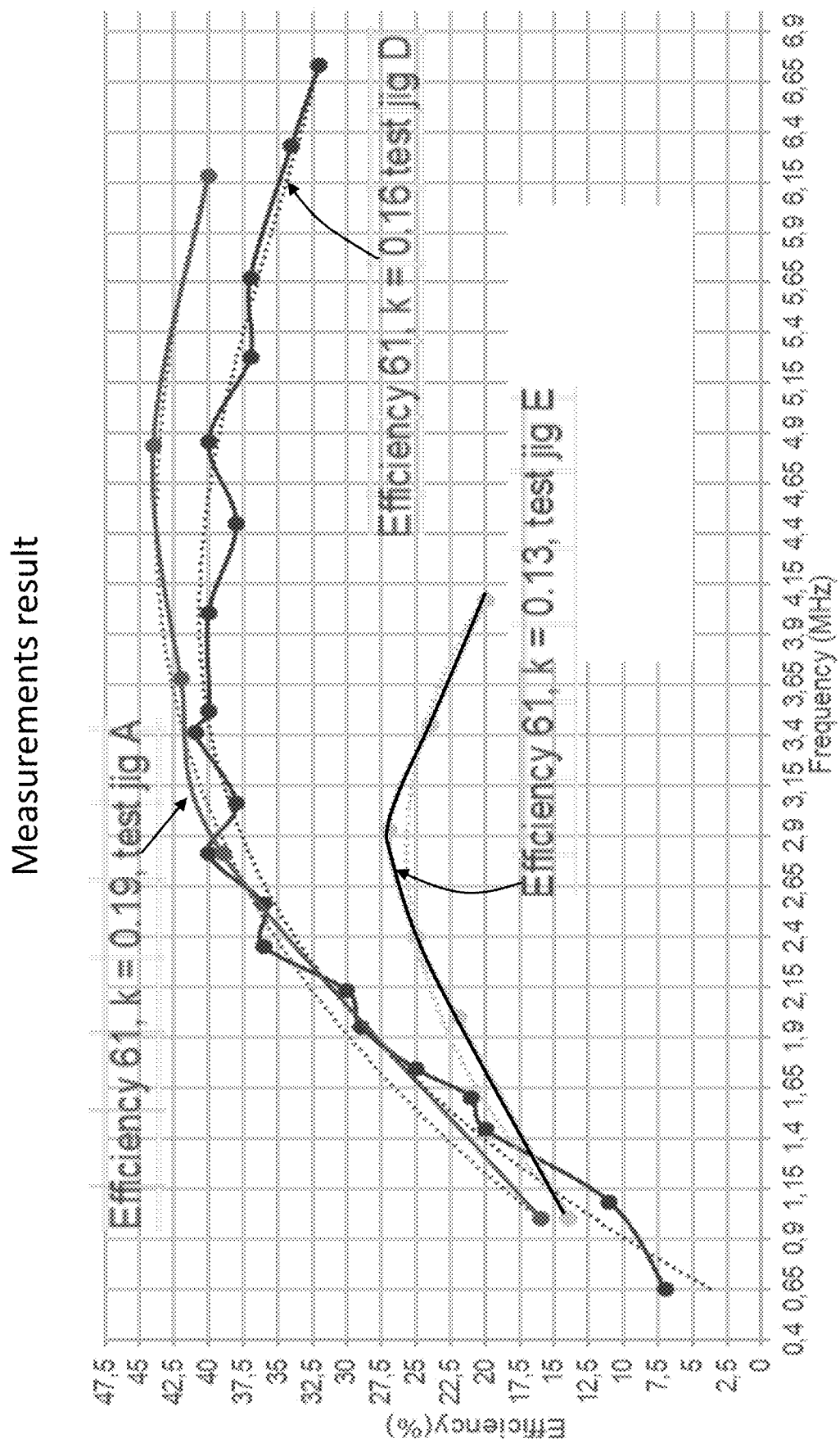
FIG. 11 depicts a graph showing a frequency dependence of the coupling factor in an example.

FIG. 11 illustrates measured efficiency of the energy transfer as a function of resonance frequency of the charger antenna and for three different examples of the charger unit 31. Where the coupling efficient is 0.19 at 2.5 MHz (i.e. resonance frequency), the magnetic shielding part is made of copper, and where the coupling efficient is 0.16 at 2.5 MHz (i.e. resonance frequency), the magnetic shielding part is made of aluminum, and where the coupling efficient is 0.13 at 2.5 MHz (i.e. resonance frequency), the magnetic shielding part and the charger antenna is not toroidal shaped.

In the preferred example, where the magnetic shielding part is made of copper, the resonance frequency range of the charger antenna may be between 1.7 MHz and 8 MHz, such as 2 MHz and 7 MHz, such as 2.5 MHz and 4 MHz, or around 2.5 MHz.

In this specific example, the rechargeable battery is a lithium ion battery.

The end-faces 14 may be flat surfaces each or may have a more complex shape. Flat surfaces are preferred as manufacturing of the toroidal core 11 is facilitated. Preferably, the end-faces 14 are parallel surfaces, so that the magnetic field in the toroidal core 11 enter into the air-gap 13 in a direction, which is substantially orthogonal to the end-faces 14, and the magnetic field density is as homogeneous as possible within the air-gap 13 of the toroidal core 11.

FIGS. 1B, 1C, 1D illustrate further charging antenna units 10 having further toroidal cores 11 according to modifications. FIG. 1B shows a toroidal core 11 having a substantially circular shape according to a modification. Hence, the charging antenna unit 10 is similar to the charging antenna unit 10 according to FIG. 1A. The toroidal core 11 according to FIG. 1B has a substantially circular shape consisting of straight portions 15 and edge portions 16. In this case, the number of edge portions 16 is four, but the number of edge portions 16 can be any number.

FIG. 1C shows a toroidal core 11 having a substantially circular shape according to a modification. Hence, the charging antenna unit 10 of FIG. 1C is similar to the charging antenna unit 10 according to FIG. 1A and FIG. 1B. The toroidal core 11 according to FIG. 1C has a substantially circular shape consisting of several straight portions 15. The number of straight portions 15 is five in the case of FIG. 1C, but the number of straight portions 15 can be any number, as long the straight portions 15 together resemble a toroidal core 11.

The advantage of the toroidal core 11 according to FIG. 1C is that the toroidal core 11 can be easily manufactured, e.g. by composing the toroidal core 11 from several straight core parts, e.g. rods, which may be glued together or the like, so that the core parts adjoin each other.

It is important that the parts, from which the toroidal core 11 is manufactured, be adjoined as close as possible, since it is important to retain the magnetic field in the core material, from one end-face 14 to the other end-face 14.

If the core parts are separated by additional gaps, some of the magnetic field will be disperse, with degradations of the efficiency, and increased electromagnetic emissions from the toroidal core 11. Hence, less energy will be transferred to the receiver coil, and the coupling factor k will be reduced. Furthermore, some of the fringing field can reach parts of the device to be charged which can have unwanted effects on the device to be charged, e.g. the battery of the device to be charged 21 may heat it up. Furthermore, shielding requirements in order to meet EMC requirements may be higher in case of fringing fields. Hence, this is not preferred and additional gaps (other than the air-gap 13) should be avoided.

FIG. 1D shows a toroidal core 11 having a substantially circular shape according to a modification, which allows adapting the length of the air-gap 13. Hence, the charging antenna unit 10 of FIG. 1D is similar to the charging antenna unit 10 according to FIG. 1A to FIG. 1C. The toroidal core 11 according to FIG. 1D is made from two parts, a left part 11A and a right part 11B, which are put together in such a way that the two parts 11A and 11B touch each other, but are not permanently fixed to each other. That is, the two parts 11A and 11B are easily movable with respect to each other by a predetermined amount; for example, the left part 11A may be rotated with respect to the right part 11B. It will be understood that "left" and "right" are relative terms and are not meant to be restrictive. E.g. these terms may be interchanged if the toroidal core is viewed from another side.

However, additional air-gaps are to be avoided, so that the shapes of the touching surfaces of the two parts 11A and 11B have to have a suitable shape, so that if the two parts 11A and 11B are moved with respect to each other, the surfaces stay in touch to each other, that is the two parts 11A and 11B adjoin each other in each of the predetermined positions, except for minute air-gaps due to tolerances or the like.

Hence, it is preferable that the touching surfaces of the left part 11A and the right part 11B have e.g. a circular, cylindrical or spherical shape so that the surfaces have matching radii, that is, the same center of rotation, as in a cylindrical joint or ball joint.

It is obvious to the skilled person that the electrical conductor of the excitation coil 12 of the toroidal core 11 according to FIG. 1D must be arranged in such a way, that it does not restrict the movement of the two parts 11A and 11B in the predetermined amount.

The possibility to move the two parts 11A and 11B with respect to each other allows for an adjustable air-gap 13 in terms of its gap width. This allows adapting the charging antenna unit 10 to the size of the device to be inductively charged 21.

Again, the two parts 11A and 11B shall be as close as possible to each other to avoid fringing fields and a decrease of coupling efficiency as discussed before.

It is obvious for the skilled person that the modifications as shown in FIGS. 1A to 1D can be freely combined with each other, that is, e.g. the toroidal core 11 according to FIG. 1A may be composed from several parts as shown in FIG. 1C, while e.g. the toroidal core 11 according to FIG. 1B may be provided with a cylindrical joint as shown in FIG. 1D and so on.

FIG. 2A shows a charging arrangement of a charging antenna unit 10 and a device to be inductively charged 21. As can be seen from FIG. 2A, the device to be inductively charged can be completely inserted into the air-gap 13 of the toroidal core 11 of the charging antenna unit 10. This provides for the advantage of a very compact arrangement.

However, there might be parts of the device to be inductively charged 21, which might be negatively affected by strong magnetic fields or might be affected by secondary effects of alternating magnetic fields, such as heating due to induced currents in conductive materials (eddy-currents).

Figure 2B:
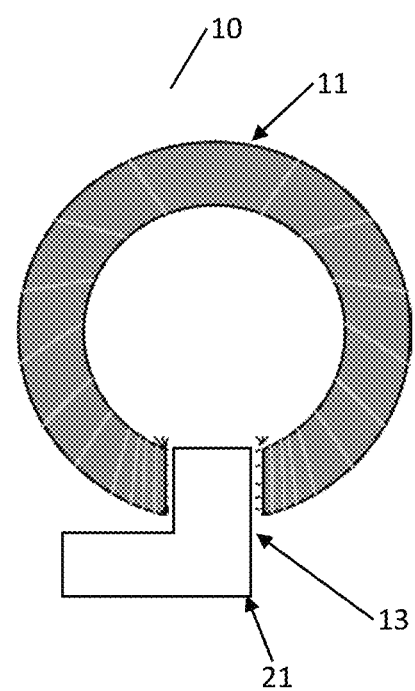
FIG. 2B illustrates another charging arrangement according to a modification.

FIG. 2B shows a modification of the charging arrangement according to FIG. 2A. As can be seen from FIG. 2B, the device to be inductively charged 21 is only partially introduced into the air-gap 13 of the toroidal core 11 of the charging antenna unit 10. This provides for the advantage of having parts of the device to be inductively charged 21, which are completely in the magnetic field of the air-gap 13, while other parts of the device to be inductively charged 21 are only partially inserted into the magnetic field and hence, are not affected by the magnetic field excited in the toroidal core 11. Preferably, a part of the device to be inductively charged 21 is introduced into the air-gap 13, which has a receiving antenna. That is, the air-gap of the toroidal core 11 is designed such that a receiving antenna of the device to be inductively charged can at least partially be inserted therein.

Figure 3A:
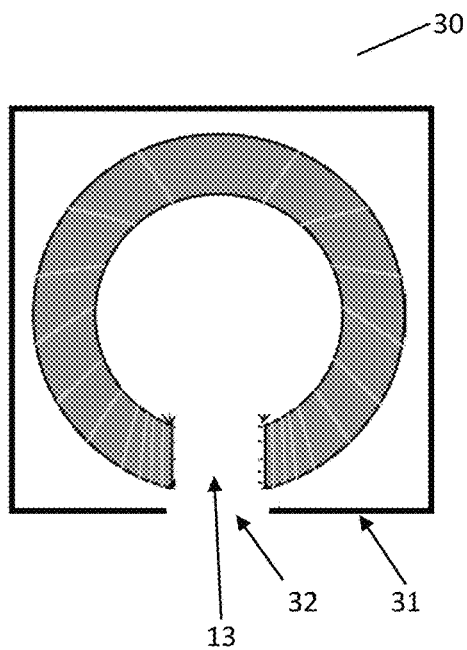
FIG. 3A illustrates a charger unit according to a further aspect of the invention.

FIG. 3A illustrates a charger unit 30 according to a further aspect of the invention. The charger unit 30 according to FIG. 3A provides a housing 31 having an opening 32, which encloses a charger antenna unit 10 according to any of the embodiments described before. The housing 31 is provided to protect the charging antenna unit from dust and to give the charger unit 30 an outer appearance. The housing 31 allows inserting a device to be inductively charged at least partially into the air-gap 13 of the toroidal core 11.

Figure 3B:
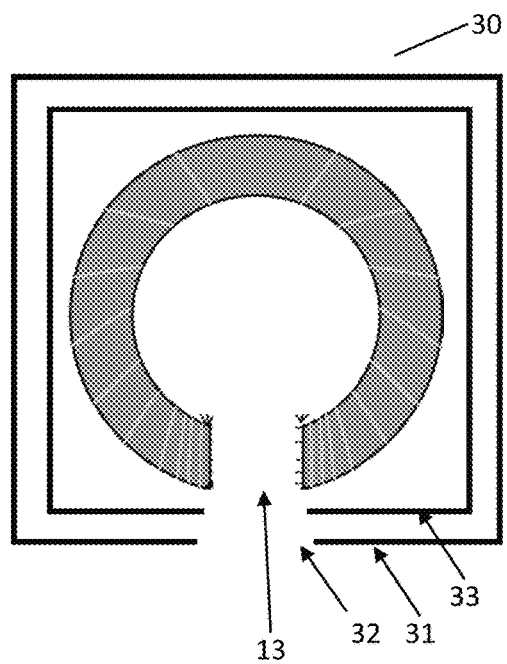
FIG. 3B illustrates another charger unit according to a modification.

FIG. 3B shows a modification of the charger unit 30 shown in FIG. 3A. The charger unit 30 according to FIG. 3B provides an additional magnetic shield 33 in the housing 31, which encloses the toroidal core 11 for the reduction of stray magnetic fields outside the air-gap 13 of the toroidal core 11. The magnetic shield has openings, so that the magnetic field is not shielded in the air-gap 13, while the openings are designed such that they allow inserting a device to be inductively charged at least partially into the air-gap 13.

The magnetic shielding 33 may be made from at least one material selected from copper, copper-alloy, aluminum, a material having high electrical conductivity allowing the occurrence of eddy currents in the material, a mu-metal, permalloy, supermalloy, soft ferromagnetic alloy, or a material having a high magnetic permeability and low magnetic coercitivity.

If a magnetic shielding 33 made from copper is used, in order to achieve a high electrical conductivity it is preferable that the thickness of the copper layer is at least 70 µm. Depending on the type of material or materials used for the magnetic shielding, the thickness of the metallic layers may be around 40-50 µm, even thinner. The required thickness also depend on the field strength of the field emitted from the toroidal core.

If another material such as Aluminum is used, the magnetic shielding may have a lower performance and different key parameters may be lowered.

Preferably, there is a magnetic field only inside the air-gap 13 of the toroidal core 11, and no magnetic field on the outside of the housing 31. This allows reducing stray emissions in order to fulfill regulatory requirements for the emission of electromagnetic fields emitted by electrical devices.

Figure 3C:
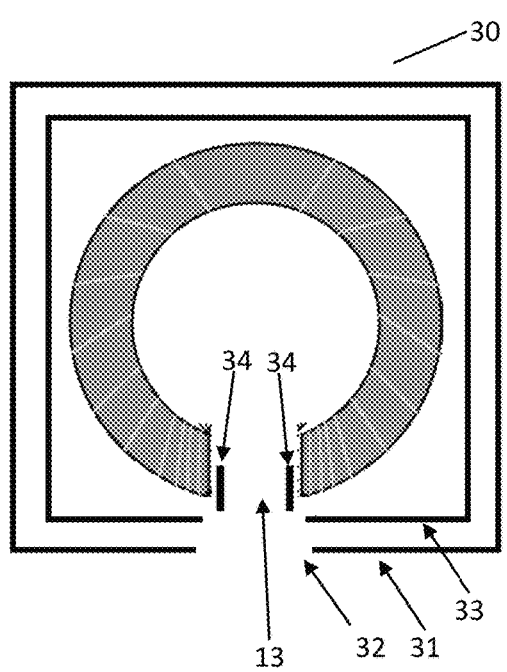
FIG. 3C illustrates another charger unit according to a modification.

FIG. 3C illustrates a modification of the charger unit shown in FIG. 3A. However, in the charger unit 30 according to FIG. 3C, a shielding component is introduced into the air-gap 13 of the toroidal core 11. The shielding component 34 protects parts of the device to be inductively charged from the influence of the magnetic field excited in the toroidal core 11 and in the air-gap 13. The shielding component 34 can be made from any material having a high magnetic permeability, while having low magnetic coercitivity, or can be made from any material having high electrical conductance. Hence, the magnetic field can be better guided in the toroidal core 11, which increases the efficiency of the charger unit 30.

Due to the same reasons as mentioned above, the shielding component 34 can be made from the same materials as the magnetic shield 33.

Figure 3D:
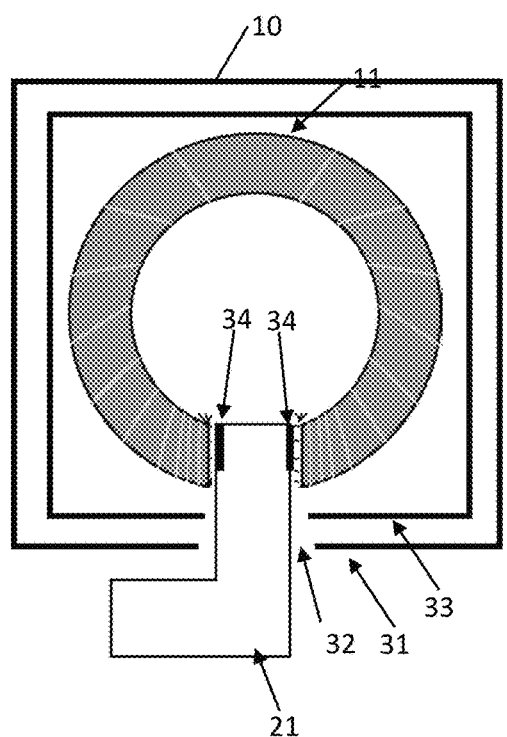
FIG. 3D illustrates another charger unit according to a modification.

FIG. 3D illustrates a modification of the charger unit 30 shown in FIG. 3A. However, in the modification shown in FIG. 3D, the shielding component 34 is included in the device to be inductively charged 21. This allows a reduction in size of the shielding component 34, while it still allows protecting sensitive parts of the device to be inductively charged 21 from the influence of the magnetic field of the charger unit 30.

Figure 4A:
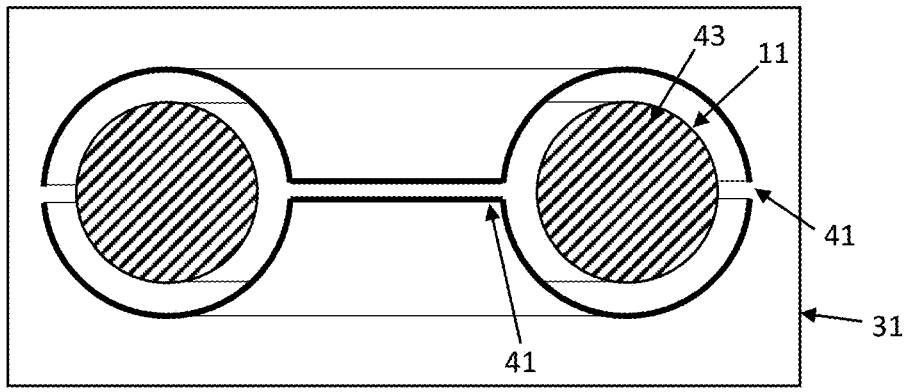
FIG. 4A illustrates a magnetic shield for use in a charger unit according to a modification.

In a modification according to FIG. 4A, the magnetic shield 33 can be composed of an upper magnetic shield part 33A and a lower magnetic shield part 33B. The magnetic shield part 33A and the magnetic shield part 33B are separated by slits 41 in order to avoid circular eddy currents enclosing the toroidal core 11. The slits 41 may be established by a single slit or made up of several slits. In the magnetic shield 33 depicted in FIG. 3B, poloidal circular eddy-currents may be induced by the magnetic field excited in the toroidal core 11, and hence, may reduce the magnetic field excited in the toroidal core 11. The upper magnetic shield part 33A and a lower magnetic shield part 33B may be configured so that the upper magnetic shield part 33A abut a part of the lower magnetic shield part 33B and an electrically insulating material may be placed between them. The slit or slits may be advantageously be formed where the collected magnetic shield 33 is separated into two, or possibly more, parts.

Figure 4B:
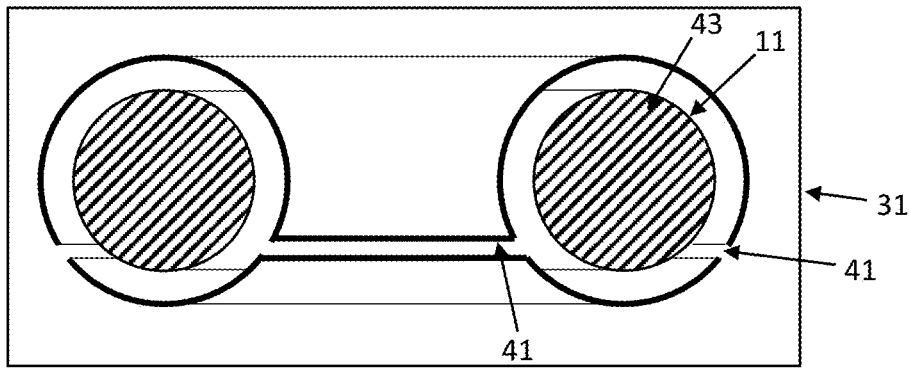
FIG. 4B illustrates another magnetic shield for use in a another charger unit according to a modification.

Hence, it is preferred to use a modification according to FIG. 4B, in which the slits 41 are provided to separate the magnetic shield 33 into the upper magnetic shield part 33A and the lower magnetic shield part 33B, so that the excitation of circular eddy currents is avoided.

It is noted that FIG. 4A shows a toroidal core 11 having a cross-section 43, which in this case is a circular cross-section 43. However, the cross-section 43 of the toroidal core 11 can also be e.g. a rectangular shape, an elliptical shape, a polygonal shape, or so on.

This slits 41 may have a toroidal shape in the same plane as the toroidal core 11 or in a plane parallel to the plane of the toroidal core 11. However, the slits 41 can have any shape as long as the excitation of poloidal circular eddy currents enclosing the toroidal core 11 are avoided, while the slits 41 can be designed to facilitate mounting of the toroidal core 11. For example, FIG. 4B shows a modification of a magnetic shield 31 having two slits 41 which allow easy mounting of the toroidal core 11 in the magnetic shield 33.

Figure 4C:
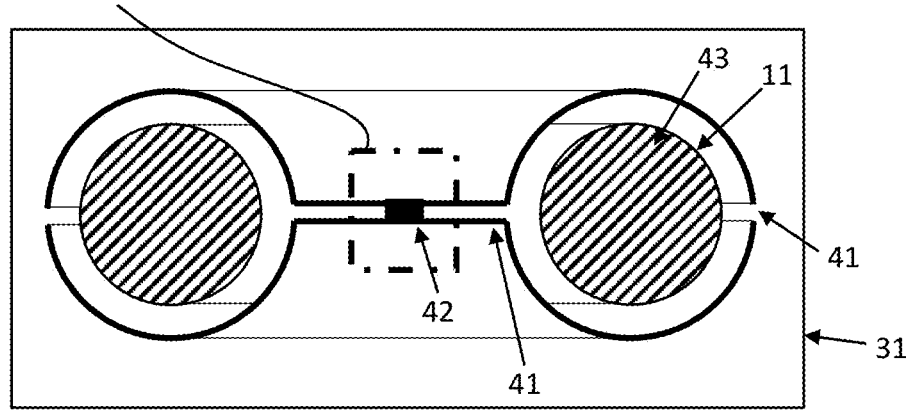
FIG. 4C illustrates another magnetic shield according to a modification.

However, if the two housing parts 33A and 33B are electrically separated, voltage differences may build up between the upper magnetic shield part 33A and the lower magnetic shield part 33B, so that it is preferred that the upper magnetic shield part 33A and the lower magnetic shield part 33B are galvanically connected, e.g. by a wired conductive connection, a rigid conductive connection, or by a central connecting portion 42 as depicted in FIG. 4C. An insert 100 is seen in FIG. 4C It is important that the galvanic connection passes on the inside of the toroidal core 11, since if there is a possibility of currents enclosing the toroidal core 11 in the poloidal direction, the magnetic field can be shorted and lower magnetic field strength will be received, so that the coupling factor k will reduce.

Hence, it is preferred that the galvanic connection is arranged in the center of upper magnetic shield part 33A and the lower magnetic shield part 33B in order to comply with EMC requirements.

Figure 5:
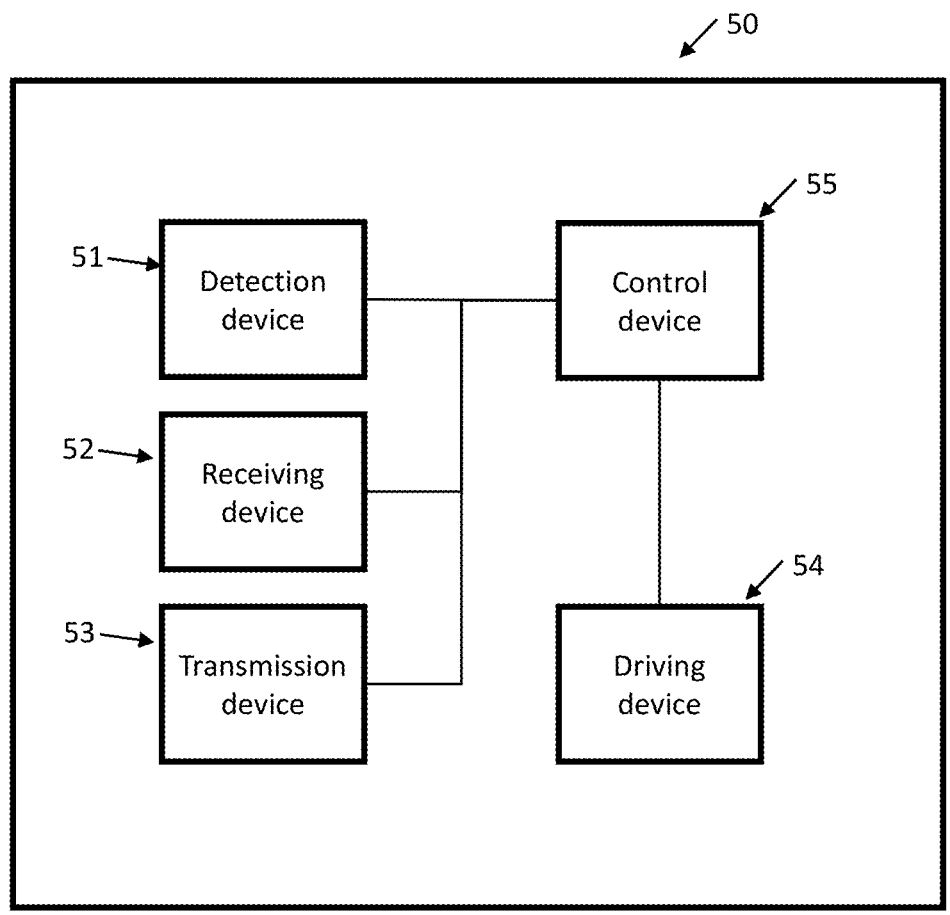
FIG. 5 schematically illustrates a charger device according to a further aspect of the invention.

FIG. 5 schematically illustrates a charger device 50 according to a further aspect of the invention. The charger device 50 may comprise a charger unit 30 according to any of the aspects described before, detection means 51, receiving means 52, driving means 54, and control means 55. Furthermore, it may comprise transmission means 53.

The detection means 51 is provided to detect the presence of the device to be inductively charged 21, and to transmit information relating to the presence of the device to be inductively charged to the control means 55. The detection means 51 can be realized using a mechanical switch, an inductive sensor, a capacitive sensor, an optical sensor, or the like. Once the device to be inductively charged 21 is inserted into the air-gap 13 for charging, the detection means is designed such that presence of the device to be inductively charged 21 is detected.

The receiving means 52 is provided to receive information relating to a charge state of a rechargeable battery of the device to be inductively charged 21 and to transmit relating information to the control means 55.

The transmission means 53 may be provided to transmit information towards the device to be inductively charged 21.

The driving means 54 is provided to operate the charging antenna unit 10, and to supply power to the charger unit 30 for exciting a magnetic field in the toroidal core 11.

The control means 55 is provided to control operation of the charging antenna unit 10 depending on the information relating to a charge state of a rechargeable battery of the device to be inductively charged 21 received by the receiving means 52, wherein the operation of the charging antenna unit is driven by the driving means 54, while the control means 55 is provided such that it does not operate the charger unit 30 is the presence of the device to be inductively charged 21 is not detected by the detection means.

Furthermore, if the detection means 51 detects that the device to be inductively charged 21 is removed from the charger unit 30, the control means 55 is configured to interrupt operation of the charger unit 30. Hence, it can be achieved, that the charger unit 30 is only operated in the presence of a device to be inductively charged 21.

Even more, the control means 55 can be configured to control the transmission means 53 to transmit information to the device to be inductively charged 21 so that the device to be inductively charged 21 determines the charge state of the rechargeable battery, and sends back information relating to the charge state of the rechargeable battery which is received by the receiving means 52. Only if the charge state of the rechargeable battery indicates that charging of the battery is required, the control means 55 will control the driving means 54 operate the charger device 50.

Furthermore, the device to be inductively charged 21 may transmit information in order to achieve that the control means 55 stops an ongoing charging process or does not start the charging process in case it is not active. Such information may relate to e.g. a temperature of the device to be inductively charged or a temperature of the rechargeable battery.

Further, the transmission means 53 and the receiving means 52 may be configured to transmit and to receive information using the charger antenna unit 10 of the charger unit 30.

The charger antenna unit 10 may not only be driven by the driving means 54 for charging of a device to be inductively charged 21, but may also be driven by the transmission means 53 for the transmission of information to the device to be inductively charged 21. Even more, the charger antenna unit 10 may be connected to the receiving means 52, so that information from the device to be inductively charged can be received using the charger antenna unit 10. However, the transmission means 53 and the receiving means 52 may use a different antenna structure, or may use separate antenna structures.

Figure 6:
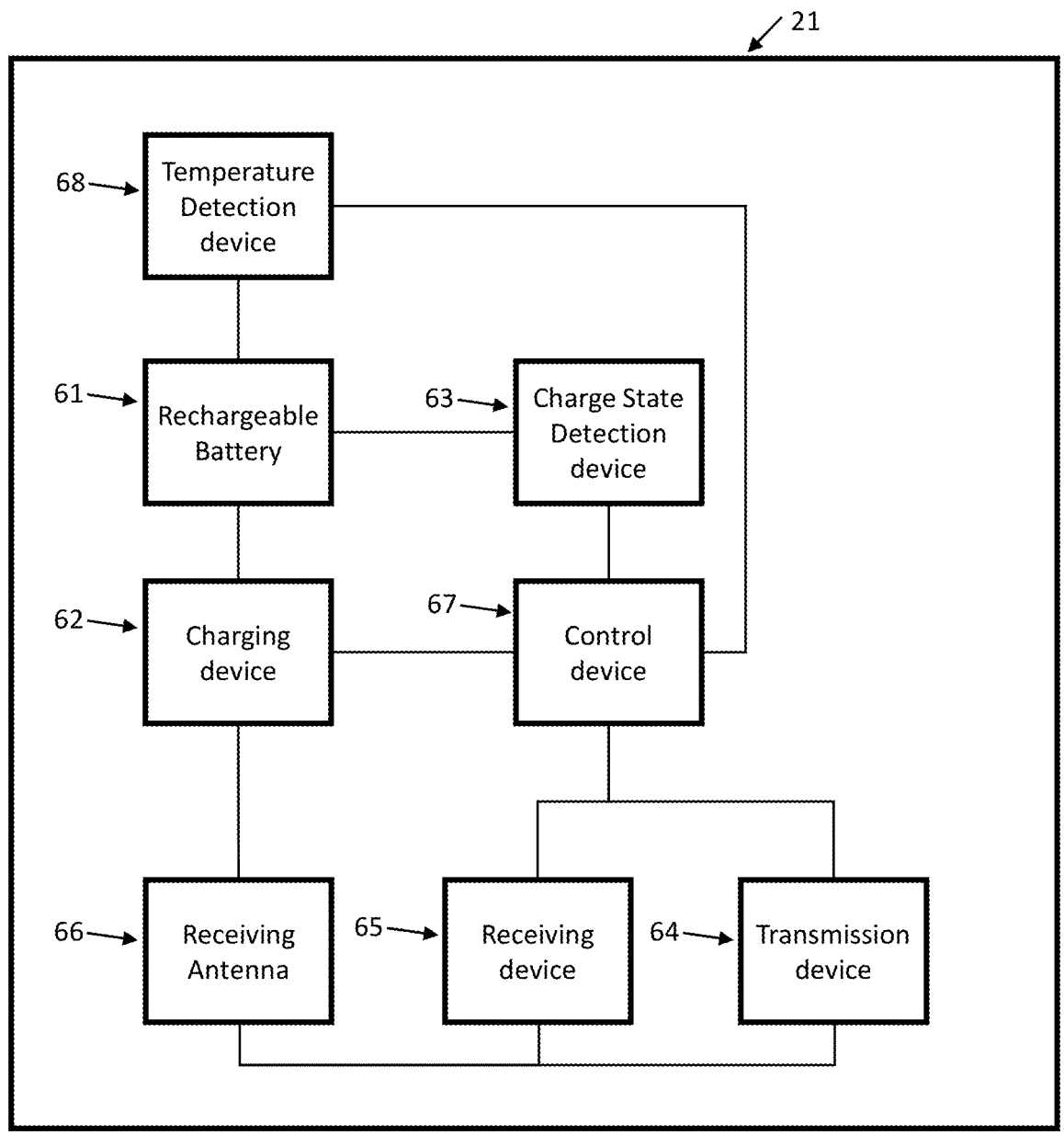
FIG. 6 schematically illustrates a device to be inductively charged according to a further aspect of the invention.

FIG. 6 schematically illustrates a device to be inductively charged 21 according to an further aspect of the invention. A device to be inductively charged 21 according to FIG. 6 comprises a rechargeable battery 61, charging means 62, charge state detection means 63, transmission means 64, receiving means 65, a receiving antenna 66, and control means 67. The device to be inductively charged 21 is adapted to be charged using a charger device 50 according to any of the aspects described before.

The rechargeable battery 61 is a battery, which is used to store electrical power and to supply electrical power to the device to be inductively charged 21. Furthermore, the rechargeable battery 61 can be recharged.

The charging means 62 is an electrical circuit, which enables the device to be inductively charged 21 to recharge the rechargeable battery 61.

The charge state detection means 63 is an electrical circuit for measuring the charge state of the rechargeable battery 61. The charge state detection means 63 may be e.g. an electrical circuit that measures the output voltage of the rechargeable battery 61. The charge state detection means 63 may constantly detect the charge state of the rechargeable battery 61, may detect the charge state of the rechargeable battery from time to time, or may detect the charge state of the rechargeable battery 61 on request, or once the control means 67 controls the charge state detection means 63 to measure the charge state of the rechargeable battery 61.

The energy required for recharging the rechargeable battery 61 may be supplied by the receiving antenna 66.

The transmission means 64 is provided for transmission of information to a charger device 50. For example, the charge state of the rechargeable battery 21 may be transmitted to the charger device 50. Furthermore, information may be transmitted, which is used to start or stop a charging operation, while further information may be transmitted as well. Such further information may relate to a temperature of the rechargeable battery 61 or to a temperature inside the device to be charged 21.

When the rechargeable battery 21 is fully charged then the charger device 50 is configured to reduce the energy for recharging based on a measurement measure or a communication from the device under charging. The energy is reduced to a level where the device under charging, e.g. the hearing aid device, is kept in on power and without using the power from the rechargeable battery 61.

The receiving means 65 is provided for receiving information from a charger device 50. For example, the receiving means 65 may be provided to receive information from the charger device 50 triggering a measurement of the charge state of the rechargeable battery 61 by the charge state detection means 63.

Furthermore, the transmission means 64 and the receiving means 65 may be used to communicate with further devices, such as e.g. a smartphone or the like. Such communication may be performed while the device to be inductively charged 21 is charged, or may be performed independent of a charging operation. The purpose of such communication may be e.g. to communicate a charge status of the rechargeable battery 61 to the smartphone, as well as to communicate other information.

In addition, information such as a new firmware, firmware upgrades or updates, program settings, and/or configuration settings for the device to be inductively charged 21 may be transferred from the charger device 50 to the device to be inductively charged 21. To achieve this, information may be received from the device to be inductively charged 21 identifying a firmware status, configuration settings and so on. Such information is forwarded to a predetermined server, the description of which is outside the scope of this application. However, solutions for client/server architecture and solutions for determining whether a device, such as the device to be inductively charged 21, requires an update, firmware upgrade, new settings, and/or further adaptations are known in the art. Hence, such new firmware, program settings or the like may be downloaded from the predetermined server to the charger device 50, which then uploads the new firmware, program settings or the like to the device to be inductively charged 21.

Furthermore, the charger device 50 is configured to upload to a server data from the hearing aid device during, when the hearing aid device is positioned in the charger device 50. The data may be configuration data, setting data, fitting data etc. The charger device 50 may be configured to upload its configuration data or setting data.

Furthermore, the charger device 50 may be triggered or controlled by an IFTTT trigger server via a wireless interface in the charger device. The wireless interface may include WIFI or Bluetooth. The wireless charger may then be controlled by a smartphone or any article within a building via the wireless interface. The article may be a lamp, a power switch, a door etc.

Furthermore, the transmission of information between the charger device 50 and the device to be inductively charged 21 may also include information triggering a test of the functionality of the device to be inductively charged 21.

The update process described above as well as the testing procedure may also be performed using another device, which can communicate with the device to be inductively charged 21 such as e.g. a smartphone, a computer, and the like.

The communication from the charger device 50 to the device to be inductively charged 21 may be performed via the charging link between the charging antenna unit 10 of the charger device 50 and receiving antenna 66 of the device to be inductively charged 21, while the charging link as used for the charging process, may be used to transmit further information, which may be modulated into the charging link. Hence, communication from the device to be inductively charged 21 to the charger device 50 may be transmitted using an RF link, or vice versa, but thereby, more energy can be transmitted to the device to be inductively charged 21, and the power being used by the transceiver of the device to be inductively charged 21 to communicate via the RF link is reduced. In total, the charging time will be reduced.

The receiving antenna 66 is provided for receiving electromagnetic energy from the charger antenna unit 10. Since the charger antenna unit 10 provides an alternating magnetic field in the air-gap 13 of the toroidal core 11, an alternating current is induced in the receiving antenna 66. Hence, the receiving antenna may include rectifying means in order to convert the alternating current into a direct current, which can then be used to provide energy to the charging means 62.

The control means 67 is configured to control the charging of the rechargeable battery 61 by the charging means 62, to control the measurement of the charge state of the rechargeable battery 61 by the charge state detection means 63, and to control the transmission means 64 to transmit information to the charger device 50. If for example the charge state of the rechargeable battery 61 does not require further charging, the control means 67 sends information to the charger device 50 to stop or interrupt the charging process.

The coupling factor k may be defined to describe the efficiency of the energy transmission from the charger device 50 to the device to be charged 21. The coupling factor may be defined e.g. as the ratio of received energy with respect to the excitation energy, wherein the excitation energy is the energy applied to the excitation coil, while the received energy can be defined e.g. as the energy received in the receiver coil accordingly.

The excitation energy is higher with higher amplitude of the alternating excitation voltage applied to the excitation coil. The excitation energy is higher having a lower resistance of the excitation coil, hence larger excitation current in the excitation coil. The excitation energy is higher with higher excitation frequency of the alternating excitation voltage.

The received energy may be considered in similar terms for the receiver coil, while e.g. an amplitude of the induced alternating voltage or current or the product of both may be considered.

Further, a temperature detection means 68 for detection of a temperature of the rechargeable battery 61 may be provided in the device to be inductively charged 21.

As mentioned before, the temperature of the battery 61 may be of concern. Preferably, the temperature of the battery 61 of the device to be inductively charged 21 has to be kept below 45 degrees Celsius while receiving charge and after end charging.

Figure 12:
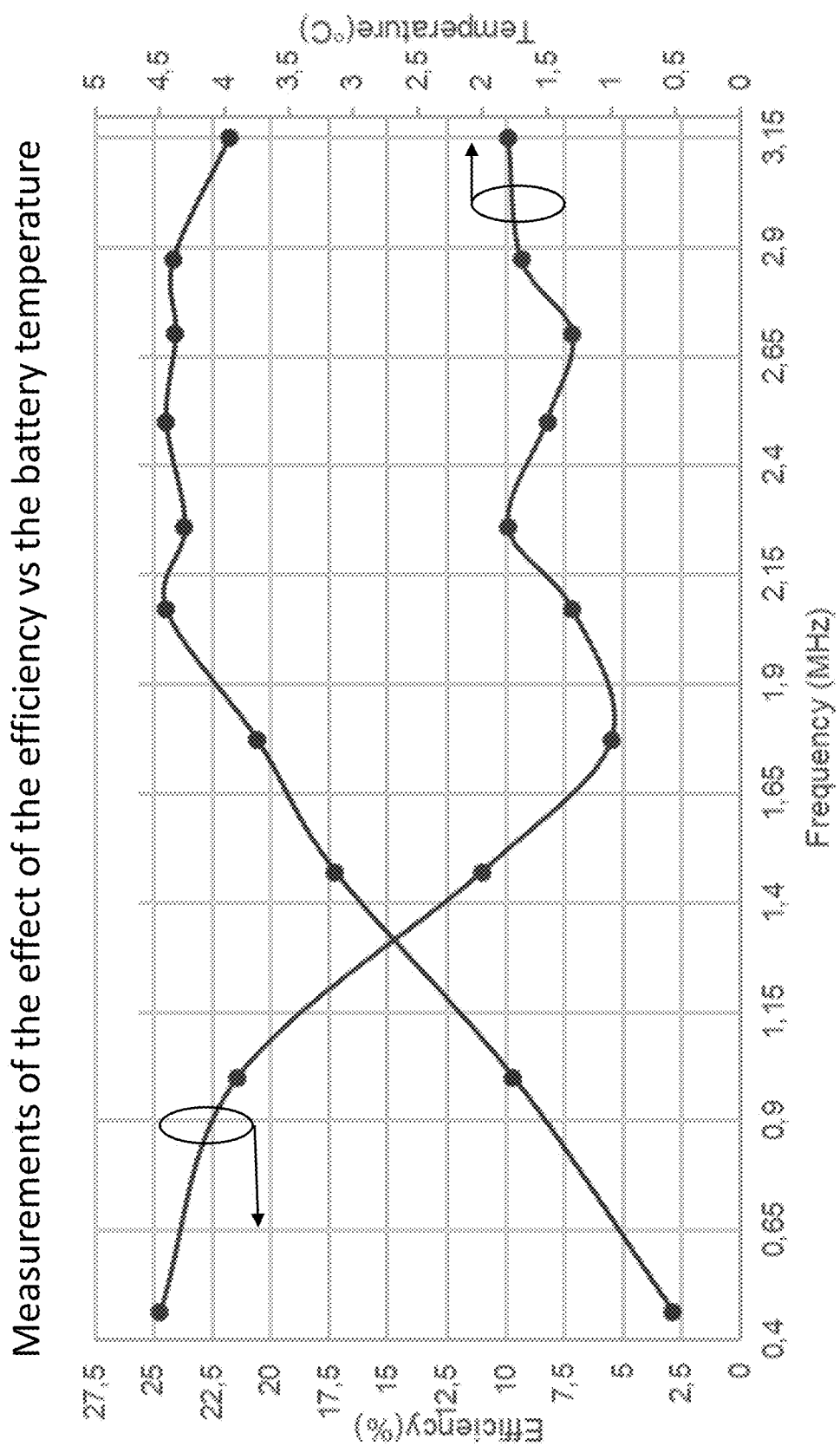
FIG. 12 depicts a graph showing a frequency dependence of the charging efficiency and the temperature of the battery in an example.

FIG. 12 illustrates measured efficiency of the energy transfer and the temperature of the battery as a function of the resonance frequency of the charger antenna. It is important to keep the battery temperature as low as possible, and therefore, the resonance frequency may not go below 1.7 MHz because of the battery temperature will be too high.

In this specific example, the rechargeable battery is a lithium ion battery

Of course, also the temperature of other components, which are sensitive to strong alternating magnetic fields may be of concern and hence, a plurality of temperature detecting means 68 may be provided.

If the battery 61 is positioned in the magnetic field or in the vicinity of the magnetic field during charging, a temperate of the battery may increase. For example, a temperature increase of more than 12° C. has been measured in comparative examples. Hence, by inductive heating, the battery or other components may be damaged.

Hence, it is important to observe the temperature of the battery 61 and/or other components, which can be provided by the temperature detection means 68 measuring the temperature of the battery 61 and/or other such components. The temperature detection means 68 may be a temperature dependent resistor, a diode, or the like, or may be a plurality of single temperature detection means 68. Information relating to the temperature of the battery 61 and such components may be transmitted to the control means 67, and the control means 67 can thus control the charging process based on the temperatures provided by the temperature detection means 68, for example is such a way, that charging is interrupted if the temperature of the battery 61 gets too high.

Hence, the control means 67 of the device to be inductively charged 21 may regulate the charging current into the battery 61, but it cannot disable the transferred power from the charger device 50 in any events.

Hence, the control means 67 may also transmit information via the transmission means 64 to the charger device 50 in order to stop or interrupt a running charging process, or send information to the charger device 50 in order to prohibit a start of a charging process in case it is not running.

Furthermore, an additional temperature sensor may be integrated close to the air-gap 13 of the excitation coil 11 of the charger device 50, in which the device to be inductively charged 21 is placed during charging. The correlation between the temperature sensor and the temperature of the battery 61 is characterized and the monitored temperature is used to adjust the transferred power to the device to be inductively charged 21 or disabling it altogether.

Figure 13:
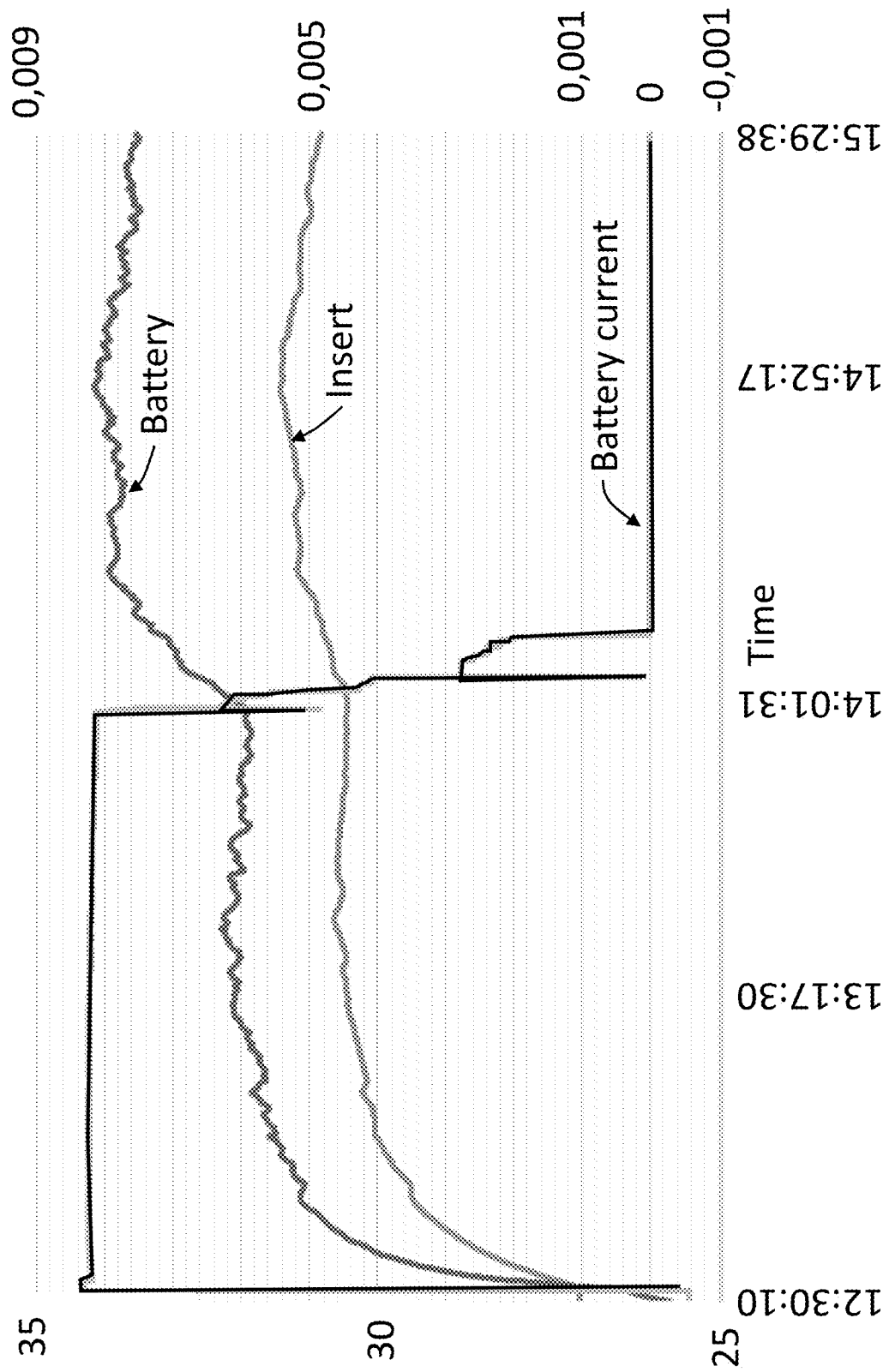
FIG. 13 depicts a graph showing a time development of a certain temperatures and a battery charging current in an example.
Figure 14:
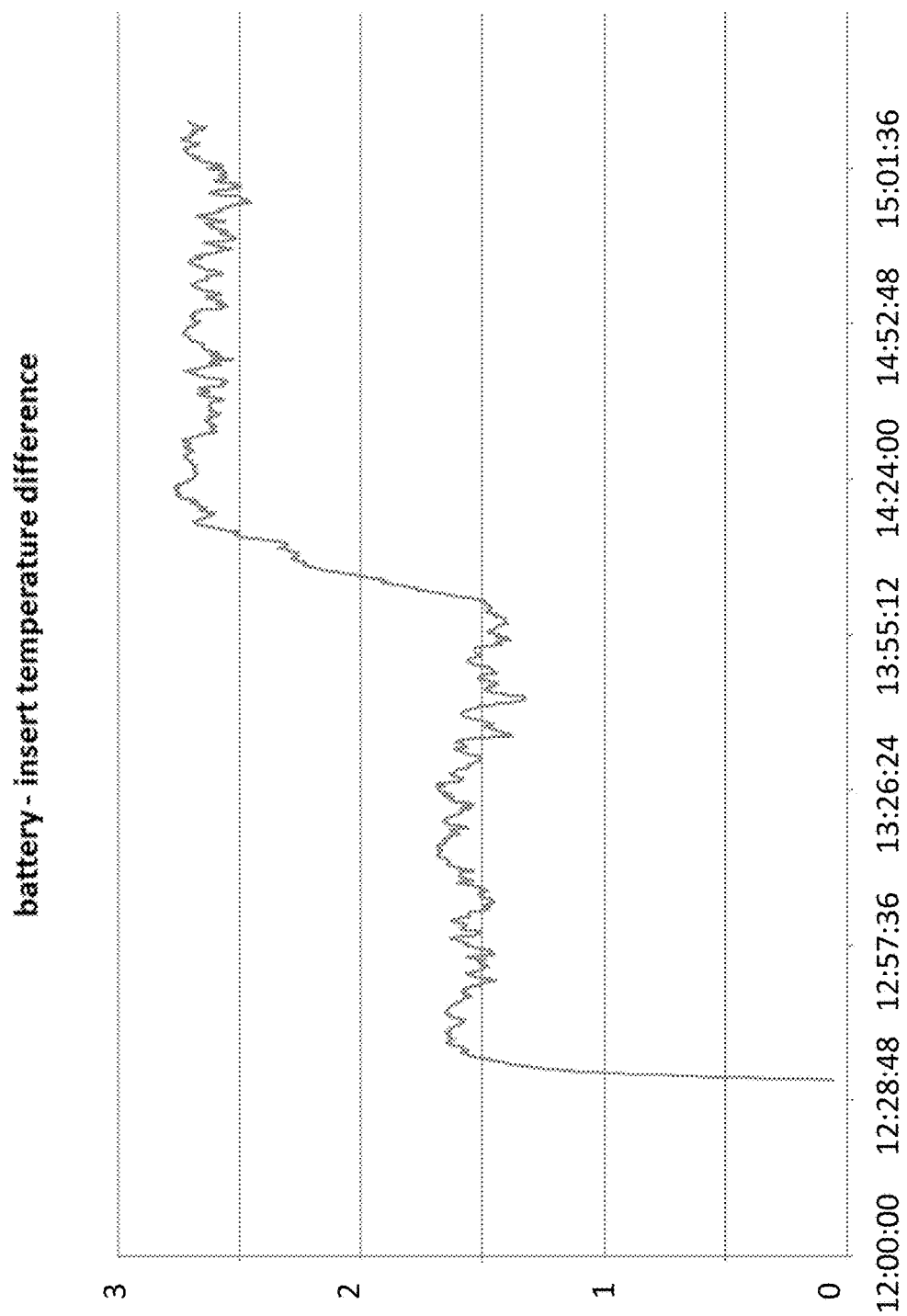
FIG. 14 depicts a graph showing a time development of a temperature difference in an example.

FIG. 13 illustrates two temperature measurements, respectively, the temperature of the battery denoted as 'battery' and the temperature around the battery denoted as 'insert', where the temperature around the battery is measured by a temperature detection mean arranged in an insert positioned in the air gap of the toroidal core. FIG. 14 illustrates the temperature difference between the temperature of the battery and the temperature around the battery to be inductively charged.

Furthermore, in FIG. 13 it is seen that when the temperature of the battery starts to increase then the energy to be transferred to the rechargeable battery is reduced by decreasing the 'battery current'.

In case, too much energy is received by the receiving means 65, or in case the battery 61 is full or cannot accept energy, it is important to dissipate any superfluous energy. However, since mobile devices tend to be get smaller, dissipating energy using e.g. a heating resistor or a shunt resistor is not preferred. Such a resistor takes up space, which is a drawback as mentioned before, while it may further heat up the battery 61 or other components and thus reduce the lifetime of the battery or the other components, because the resistor is necessarily close to the battery, as the device to be inductively charged 21 has to be compact.

Mobile devices often include a loudspeaker, that is, an electro-acoustic transducer for emission of audible signals. Hence, it is possible to dissipate energy by e.g. running a direct current through the loudspeaker. Such loudspeaker typically has an ohmic resistance, which can be used to dissipate energy. Furthermore, the inductive resistance of the receiver coil may be used to run an AC current through it in order to emit acoustic energy.

To avoid that such dissipation of energy generates hearable noise during charging, the frequency can be chosen to be outside the hearable spectrum of the human ear of about 20 Hz to 20 kHz. One or more frequencies can be used, whatever is optimal.

However, it is also possible to signal a charging state of the rechargeable battery 61 e.g. to an user of the device to be inductively charged 21, by choosing one or more audible frequencies. This can be realized by generating e.g. a louder or higher tone by the receiver, the fuller the battery 61 is. The audible frequencies have the advantage of being in a range, where the amplifier used to operate the loudspeaker is optimized to operate.

According to a modification, a device to be inductively charged 21 may further comprise an electro-acoustic transducer for emission of audible signals, wherein the receiving antenna of the device to the inductively charged is positioned in an air volume of the electro-acoustic transducer.

However, in a further modification, the loudspeaker can be used in reverse, that is, the electro-acoustic transducer may be used to receive the energy for the charging. In case, the loudspeaker has an inductive coil, this coil can be used to convert mechanical movement into electric voltages.

This solution is suited especially for devices 21 having a battery 61 with small capacity, since in such case, a low efficiency charging method may be used as well.

That is, the receiver coil of the loudspeaker is used as reverse transducer, hence, converting mechanical energy (movement) into electrical energy. Feeding energy "backwards" into the loudspeaker for charging purposes can be done in several ways:

The loudspeaker can be used as a microphone. The charger device 50 instead of emitting a magnetic field makes a loud sound and sends it into the receiver. By the loud sound, the membrane of the loudspeaker is moved, which induces a voltage in the coil of the loudspeaker. This voltage can be rectified and used to charge the battery 61. Hence, the device 21 can be inductively charged.

Furthermore, the loudspeaker may be used as a linear dynamo, by mechanically moving the membrane of the loudspeaker back and forth. Hence, the charger device 50 is provided with a piston that vibrates the membrane of the loudspeaker. Hence again, the device 21 can be inductively charged.

Furthermore, as mentioned before, the loudspeaker coil can be used to pick up the varying magnetic field generated by the charger device 50. This induces a current in the coil of the loudspeaker and hence again, the device 21 can be inductively charged.

Since mobile devices need to get smaller to be attractive, any available volume may be used for the placement of components inside the device to be inductively charged 21. Such a volume can be found also in the sound canal of a loud speaker, which allows for an even more compact design of the electroacoustic transducer and the receiving antenna of the device to be inductively charged 21. Hence, the size of the device to be inductively charged 21 can be further reduce and thus, the efficiency of the charging process can be further increased. Additionally, this allows for the additional benefit of enabling a modification of the emitted sound.

Even further, other coils might exist in the device to be inductively charged 21 such as a telecoil 71, or a coil 72.

Figure 7A:
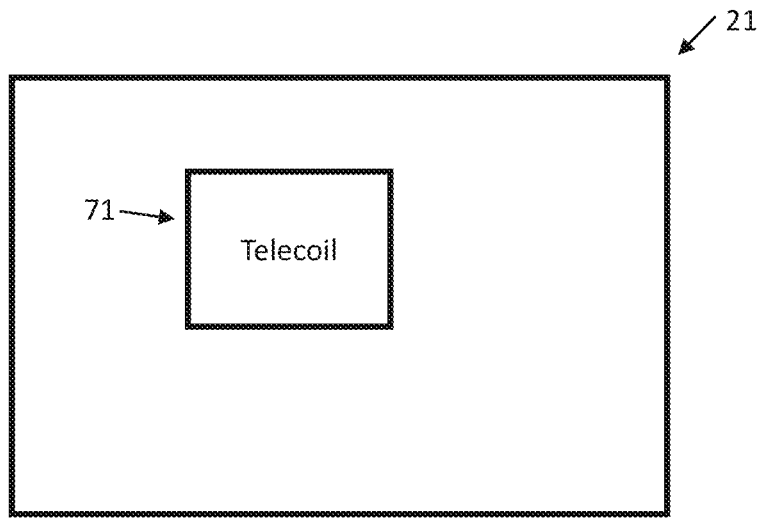
FIG. 7A schematically illustrates a telecoil in a device to be inductively charged according to a modification.
Figure 7B:
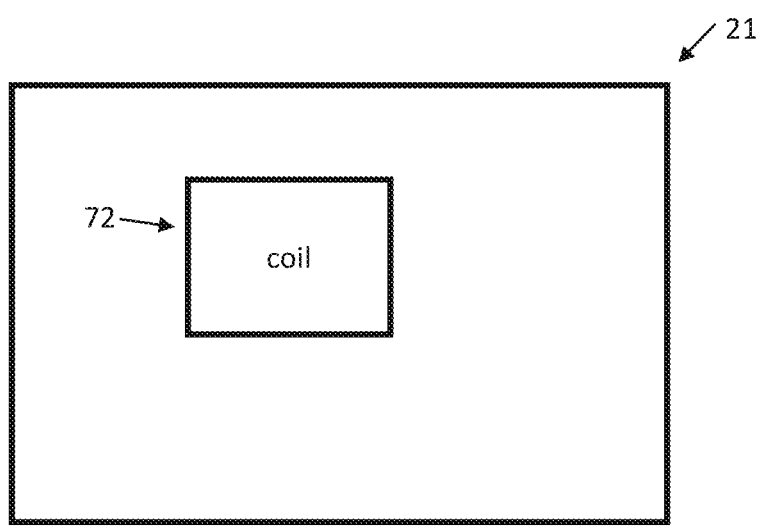
FIG. 7B schematically illustrates a coil arrangement in a device to be inductively charged according to a modification.

FIG. 7A schematically illustrates a telecoil 71 in a device to be inductively charged 21 according to an embodiment of the disclosure, while FIG. 7B schematically illustrates a coil 72 in a device to be inductively charged 21 according to an further embodiment of the disclosure.

A telecoil 71 (also called T-coil or telephone coil) is a coil installed e.g. in a hearing aid or an cochlear implant. An external magnetic field generated e.g. in a room by a stationary induction coil can thus be detected by a telecoil 71 in the hearing aid, allowing to transmit audio signals directly to the hearing aid. However, it is also possible to use the telecoil 71 as the receiving antenna 66.

Furthermore, a coil 72 may be installed in a device 21 for e.g. Bluetooth® communication between different devices 21 or communication to other devices, such as a smartphone. As with the telecoil 71 mentioned before, also a coil 72 may be used as receiving antenna 66. Since no additional components are required in this case, a smaller device 21 can be realized. of course, the frequency of the alternating magnetic field has to be adapted accordingly to allow efficient energy transfer.

As mentioned before, it is important that the rechargeable battery 61 is protected from the influence of the magnetic field used for charging, so that an increase of the temperature of the battery 61 during a charging process has to be minimized.

Figure 8A:
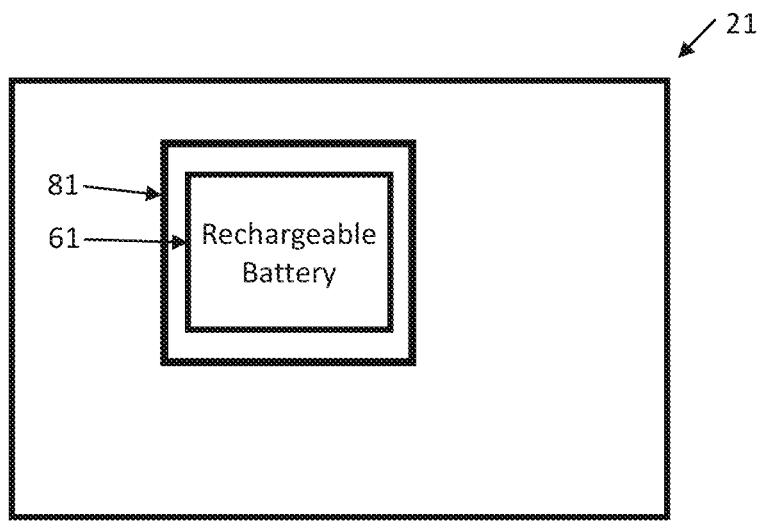
FIG. 8A schematically illustrates a shield arrangement in a device to be inductively charged according to a modification.

In this respect, FIG. 8A schematically illustrates an arrangement of a magnetic shield 81 in a device to be inductively charged 21. The magnetic shield 81 can be provided directly on the battery 61.

Figure 8B:
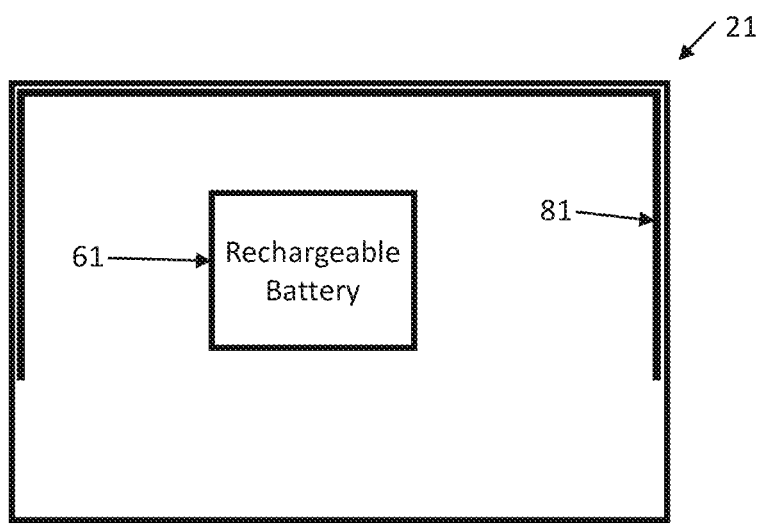
FIG. 8B schematically illustrates a shield arrangement in a device to be inductively charged according to a modification.

For example, such a magnetic shield 81 may be provided as a part of the battery connection, which comprises e.g. a flexible printed circuit-board, which has copper areas arranged in different shapes. Furthermore, such a magnetic shield 81 may be realized by the outer or inner shell of the device to be inductively charged 21 as indicated in FIG. 8B. Even more, the magnetic shield 81 may be realized by a magnetic shield 33 as depicted in FIG. 3D and explained above.

The magnetic shield 81 may be made as explained before by a highly conductive material as the magnetic shield 33, and may be provided to cover as much as possible of the surface of the battery 61. The thickness of the magnetic shield 81 may vary from less than 5 um to 100 um depending of the shielding performance that needs to be achieved.

Figure 9A:
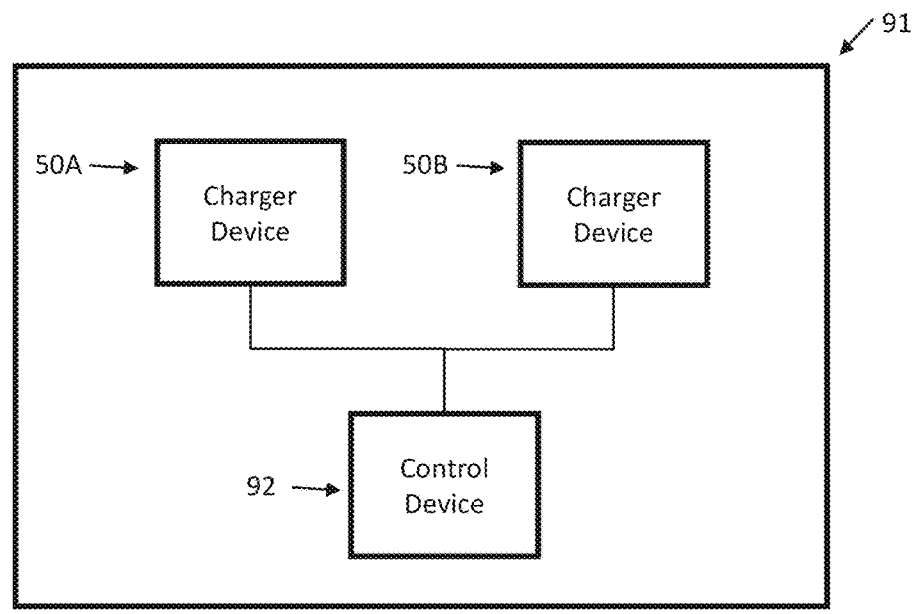
FIG. 9A illustrates a dual-charger device according to a further aspect of the invention.

According to a further aspect of the invention, a dual-charger 91 may be provided according to FIG. 9A. A dual-charger 91 may comprise two separate charger devices 50A and 50B according to any of the aspects described before. Additionally to the two separate charger devices 50A and 50B, the dual-charger 91 may comprise a control device 92, which may control the control means 55 of the two charger devices 50A and 50B in order to coordinate the charging processes of the two charger devices 50A and 50B.

In a dual-charger device 91, depending on the positioning of the two charger antenna units 10, when the charger antenna unit 10 of the first charger device 50A starts to charge a device to be inductively charged 21, a magnetic field may be induced in the second charger antenna unit 10 of the second charger device 50B. This may have an effect onto the charger antenna unit 10 of the second charger device 50B such that the resonance frequency of the charger antenna unit of the second charger device 50B may be impacted and therefore mistuned. Hence, it is important to consider the effects of the magnetic field of one charger antenna unit 10 onto the other charger antenna unit 10, and to design the dual-charger 91 in such a way, that these effects are minimized.

For example, the orientation of the magnetic field in the air-gaps 13 of the two toroidal cores 11 may be arranged so, that the directions of the magnetic fields are orthogonal to each other, in order to reduce a cross-coupling between these charger antenna units 10.

Furthermore, a further magnetic shield 81 may be arranged between the two charger antenna units 10 in order to reduce the influence of one charger antenna unit 10 onto the other charger antenna unit 10.

Figure 9B:
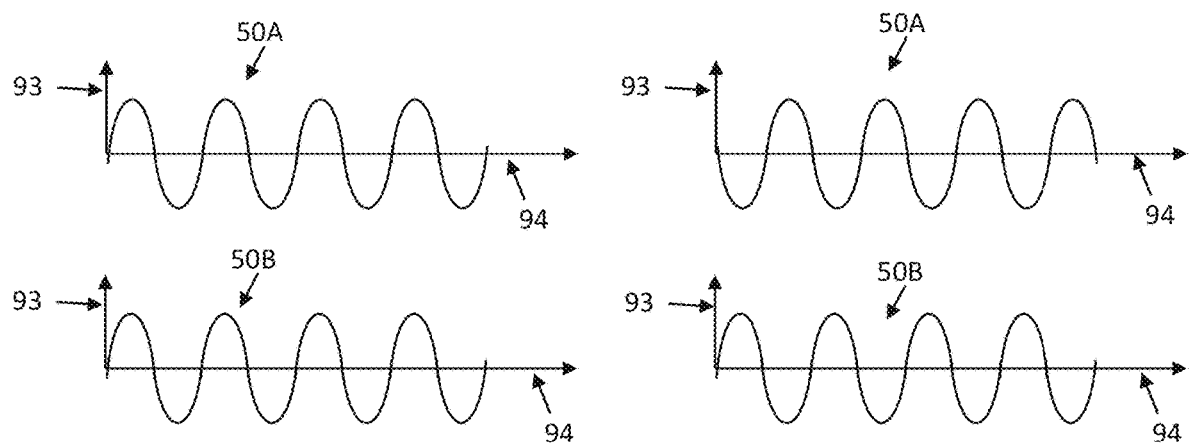
FIG. 9B illustrates driving signals of a dual-charger device according to a modification.

Even further, the control device 92 may control the two charger devices 50A and 50B in such a way that the phases of the alternating currents in the charger antenna units 10 are shifted in phase by 180°. FIG. 9B shows a respective graphs displaying the amplitudes of the alternating currents in the charger antenna units 10 of the first charger device 50A and of the second charger device 50B. In each graph, the ordinate 93 depicts the amplitudes A of the alternating currents, while the abscissa 94 depicts the time.

In the not preferred case as depicted in the left part of FIG. 9B, the signals in the charger antenna units 10 are synchronous and hence, have a phase shift of 0° or no phase shift. Note that the abscissa 94 is the same for the upper and the lower graph.

In the preferred case as depicted in the right part of the FIG. 9B, the phases of the signals are shifted by 180° so that a common mode noise of the dual-charger 91 as a whole can be reduced. Note that the abscissa 94 is the same for the upper and the lower graph.

Due to the large voltages and currents running in the excitation coils of the charger antenna units 10, the dual-charger may generate side-effects in the form of conducted and radiated emissions. In case the two excitation coils receive currents, which are in phase as depicted in the left part of FIG. 9B, a large common mode noise may be generated. As the dominant phenomena are common mode emissions and since the magnitude of the emissions to a large extent is dependent on the magnitude of the in-phase peak currents flowing in the excitation coils of the charger antenna units, there is a clear benefit of inverting the phase in one of the excitation coils of the charger antenna units 10 by 180°, so that the two excitation coils are driven 180° out of phase. Thus, the resulting currents flowing in the dual-charger 91 become of balanced, and to a degree cancel each other. An improvement of 15 dB in reduced conducted emission has been measured on a dual-charger 91 after inverting the phase on one of the charging antenna units 10 as depicted in the right part of FIG. 9B.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening elements may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

LIST OF REFERENCE SIGNS 10 charging antenna unit
11 toroidal core
11A left part of a split toroidal core
11B right part of a split toroidal core
12 excitation coil
13 air-gap
14 end-face
15 straight portion
16 edge portion
21 device to be inductively charged
30 charger unit
31 housing
32 opening
33 magnetic shield
34 shielding component
41 slit
42 central connecting portion
43 cross-section
50 charger device
50A, 50B charger devices
51 detection means
52 receiving means
53 transmission means
54 driving means
55 control means
61 rechargeable battery
62 charging means
63 charge state detection means
64 transmission means
65 receiving means
66 receiving antenna
67 control means
68 temperature detection means
71 telecoil
72 coil
81 magnetic shield
91 dual-charger
92 control device
93 ordinate
94 abscissa

The invention claimed is:

1. A charger configured to charge a device to be wirelessly charged, the charger comprising:
   an antenna unit for charging a device to be inductively charged, the antenna unit including:
   an excitation coil made of an electrical conductor wound around a toroidal core to excite a magnetic field inside the toroidal core,
   the toroidal core having an air-gap between two end-faces of the toroidal core,
   wherein the two end-faces are facing each other, wherein the end-faces of the antenna unit are configured to be parallel to each other, and
   the winding density of the excitation coil along the toroidal length of the toroidal core is higher in the vicinity of the respective end-faces as compared to the remaining parts of the toroidal core, and
   a housing having an opening adapted to be aligned with the device to be inductively charged, such that a receiving antenna of the device to be inductively charged can at least partially be inserted into the air-gap of the toroidal core of the charger antenna unit, wherein a magnetic shield is provided in the housing at the toroidal core, wherein the magnetic shield is at least partly provided as a coating or plating on a carrier medium.

2. The charger according to claim 1,
   wherein the toroidal core of the antenna unit is composed of one or more core parts, adjoining each other.

3. The charger according to claim 2,
   wherein the one or more core parts are arranged with respect to each other, so that the air-gap can be adjusted in terms of its gap width.

4. The charger according to claim 1, wherein the carrier medium is made from a thermoplastic resin, such as ABS, such as ABS resin, such as PVC, or the like.

5. The charger according to claim 1, wherein
   the magnetic shield is made out of at least one material selected from copper, copper-alloy, aluminum, or a material having high electrical conductivity allowing the occurrence of eddy currents in the material, or
   the magnetic shielding is made out of at least one material selected from mu-metal, permalloy, supermalloy, soft ferromagnetic alloy, or a material having a high magnetic permeability and low magnetic coercitivity.

6. The charger according to claim 5, wherein
the magnetic shielding is composed of a first magnetic shielding part and a second magnetic shielding part, and
the first magnetic shielding part and the second magnetic shielding part are separated from each other by slits having a toroidal shape in a plane parallel to the plane of the toroidal core of the charger antenna unit.

7. The charger according to claim 6,
wherein the first magnetic shielding part and the second magnetic shielding part are galvanically connected.

8. The charger according to claim 1, further comprising:
detector, configured to detect the presence and/or absence of the device to be inductively charged,
receiver, configured to receive information relating to a charge state of a rechargeable battery of the device to be inductively charged,
driver, configured to supply power to the charger antenna unit of the charger unit,
controller, configured to control the driver in response to received information received by the receiver,
wherein the controller is configured to control the driver to supply power to the charger antenna unit only in case the detector has detected the presence of the device to be inductively charged.

9. The charger according to claim 8, further comprising:
transmitter, configured to transmit information to the device to be inductively charged, and
wherein the receiver is configured to receive information from the device to be inductively charged.

10. The charger according to claim 9,
wherein the transmitter and the receiver are configured to transmit and to receive information using the charger antenna unit.

11. A charger configured with an opening to receive a device to be wirelessly charged, the charger comprising:
an excitation coil made of an electrical conductor wound around a toroidal core to excite a magnetic field inside the toroidal core,
the toroidal core having an air-gap between two end-faces of the toroidal core, wherein the air-gap is shaped to receive the device to be wirelessly charged including a receiving antenna, and
a housing having an opening adapted to be aligned with the device to be inductively charged, such that a receiving antenna of the device to be inductively charged can at least partially be inserted into the air-gap of the toroidal core of the charger,
wherein a magnetic shield is provided in the housing at the toroidal core, wherein the magnetic shield is provided as an encapsulating unit configured to encapsulate the toroidal core, wherein a slit is formed in the encapsulating unit apart from a location of the opening.

12. The charger according to claim 11, wherein winding density of the excitation coil along the toroidal length of the toroidal core is higher in a section at the respective end-faces as compared to the remaining parts of the toroidal core.

13. A system comprising a charger according to claim 1, and a device to be inductively charged, wherein the device to be inductively charged comprises:
a rechargeable battery for storing power used to operate the device to be inductively charged,
charge state detector to detect the charge state of the rechargeable battery,
a receiving antenna, configured to receive electromagnetic energy from a charger device for charging the rechargeable battery,
receiver, configured to receive information from a charger device,
a transmitter configured to transmit information to the charger device, and
a controller configured to control the transmitter to transmit the charge state detected by the rechargeable battery charge state detector to the charger device.

14. The system according to claim 13, herein the device to be inductively charged further comprises:
a shielding unit, configured to magnetically shield the rechargeable battery from external electromagnetic fields from the charger during the charging process.

15. The system according to claim 14,
wherein the shielding unit in the device to be inductively charged is provided directly on the rechargeable battery.

16. The system according to claim 13, wherein the device to be inductively charged further comprises a coil for high-frequency communication, wherein the coil is used as the receiving antenna of the device to be inductively charged.

* * * * *